(12) United States Patent
Weihl

(10) Patent No.: US 10,150,428 B2
(45) Date of Patent: *Dec. 11, 2018

(54) ADAPTABLE HITCH SYSTEM

(71) Applicant: Hurricane, Inc., Muskegon, MI (US)

(72) Inventor: Ricky A. Weihl, Muskegon, MI (US)

(73) Assignee: Hurricane, Inc., Muskegon, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,040

(22) Filed: Feb. 19, 2018

(65) Prior Publication Data

US 2018/0170280 A1 Jun. 21, 2018

Related U.S. Application Data

(63) Continuation-in-part of application No. 15/384,751, filed on Dec. 20, 2016, now Pat. No. 9,896,040, which is a continuation of application No. 14/753,964, filed on Jun. 29, 2015, now Pat. No. 9,555,746.

(51) Int. Cl.
*B60D 1/07* (2006.01)
*B60R 11/06* (2006.01)
*E01H 5/06* (2006.01)
*B60D 1/00* (2006.01)

(52) U.S. Cl.
CPC .............. *B60R 11/06* (2013.01); *E01H 5/061* (2013.01); *B60D 2001/008* (2013.01); *E01H 5/068* (2013.01)

(58) Field of Classification Search
CPC .. E01H 5/06; E01H 5/068; B60R 9/06; B60D 1/07; B60D 1/075; B62D 53/0807; B62D 53/0828

See application file for complete search history.

(56) References Cited

U.S. PATENT DOCUMENTS

| 3,698,740 A | 10/1972 | Chisholm et al. |
| 3,870,340 A | 3/1975 | Winter |
| 3,955,831 A | 5/1976 | Whitchurch |
| 4,438,944 A | 3/1984 | Della-Moretta |
| 4,577,882 A | 3/1986 | Kober et al. |
| 4,940,096 A | 7/1990 | Johnson |
| 5,046,271 A | 9/1991 | Daniels |
| 5,392,538 A | 2/1995 | Geerligs et al. |
| 5,433,457 A | 7/1995 | Alliff |
| 5,930,922 A | 8/1999 | Altheide |

(Continued)

*Primary Examiner* — Brian L Swenson
(74) *Attorney, Agent, or Firm* — Warner Norcross + Judd LLP

(57) ABSTRACT

A vehicle accessory hitch assembly for attaching an accessory to a vehicle. The vehicle may include a frame and a bed mounted to the frame. First and second base rails may be disposed on the bed and coupled to the frame of the vehicle, and the vehicle may include a vehicle trailer hitch with a receiver for accepting a shank. In one embodiment, the vehicle accessory hitch assembly may be mechanically connected to each of the first and second base rails and the vehicle trailer hitch such that the vehicle accessory hitch assembly is immovable or stationary relative to the first and second base rails and the vehicle trailer hitch. In another embodiment, the vehicle accessory hitch assembly may be adaptable to connect to differently-configured base rails and vehicle trailer hitch constructions, including different horizontal and vertical spacing between the base rails and the vehicle trailer hitch.

30 Claims, 18 Drawing Sheets

(56) References Cited

U.S. PATENT DOCUMENTS

| | | |
|---|---|---|
| 6,056,308 A | 5/2000 | Harrison |
| 6,148,928 A | 11/2000 | Spears |
| 6,151,809 A | 11/2000 | Altheide |
| 6,481,948 B2 | 11/2002 | Spears |
| 6,682,089 B2 | 1/2004 | Ccoy et al. |
| 6,874,260 B2 | 4/2005 | Mullett |
| 7,118,053 B2 | 10/2006 | Truan et al. |
| 2012/0261899 A1 | 10/2012 | Ockunzzi |

ADAPTABLE HITCH SYSTEM

TECHNICAL FIELD

The present application relates to a hitch system for a vehicle, and more particularly to a hitch system for attaching an implement or accessory to a vehicle.

BACKGROUND

There are a variety of conventional hitch constructions for vehicles. Two of these conventional hitch types have reached a near ubiquitous level of recognition: (1) a trailer hitch having a receiver for receiving a shank and (2) a fifth wheel hitch. A third, less recognized conventional hitch is a custom hitch assembly designed to accommodate a particular vehicle and implement or accessory configuration. Each of these conventional hitches is often times used for one or more particular fields. For example, the conventional trailer hitch in many instances receives a shank attached to an accessory, such as a drawbar with a ball mount located proximate to an end of the shank. Accessory configurations can vary from application to application. To provide some additional examples, the drawbar can be used to tow a boat trailer, or the accessory can be a bike rack or cargo carrier. The conventional trailer hitch provides a single point connection to the vehicle—via the receiver—and therefore the type of accessories used in connection with this conventional trailer hitch are often times limited to accessories that do not require significant lateral stability or significant lateral loads. For example, a conventional trailer hitch is considered effective in towing applications, but less effective in the realm of a plow implement that exerts downward force or is subjected to lateral forces or loads.

The conventional trailer hitch, itself, may be mounted to the rear frame of the vehicle. There are several classes or variations of the trailer hitch, but a 2 in. by 2 in. receiver or a Class III or IV trailer hitch is one of the more common constructions. Many trucks and sport utility vehicles are fitted with such a Class III or IV trailer hitch. The Class of this type of conventional trailer hitch is generally indicative of the weight capacity of the hitch and the receiver size. There are several additional classes, such as Class I or Class V, trailer hitches available, depending on the application and desired weight carrying capacity.

The fifth wheel hitch, another conventional hitch, can be used in various towing applications, such as to tow a semi-trailer or recreational vehicle. The fifth wheel hitch utilizes a single point connection like the conventional trailer hitch, but, in some cases, provides greater towing stability over the conventional trailer hitch. Rather than the receiver and shaft construction of the trailer hitch, the conventional fifth wheel hitch utilizes a horseshoe shaped coupler that rotates to capture a kingpin mounted to the accessory being linked to the fifth wheel hitch. The conventional fifth wheel hitch construction is used in nearly all semi-trailer trucks or tractors on the road today in the U.S. The conventional fifth wheel hitch construction has also been used in the realm of pickup trucks or a truck having an open bed. The fifth wheel hitch can be mounted on two rails located on the truck bed and coupled to the frame of the truck through the truck bed. Because trucks of different makes can have different dimensions, the position of the rails, and therefore the fifth wheel hitch, within the truck bed often times varies between truck makes. Although the conventional fifth wheel hitch may offer additional stability over the conventional vehicle trailer hitch, conventional fifth wheel hitches, like the conventional vehicle trailer hitch, are used primarily for towing, and therefore tend to be less stabile when subjected to lateral loads. The kingpin is allowed to rotate within the fifth wheel to facilitate traversing turns while towing an accessory, such as a trailer. In this way, the accessory is capable of rotating or pivoting about the fifth wheel.

In circumstances in which a hitch accessory or implement is not configured to interface with a conventional trailer hitch or fifth wheel hitch, a custom hitch can be constructed according to the specific dimensions of the hitch accessory and the vehicle to which the hitch accessory or implement is being attached. For example, custom hitches are often times used in conjunction with rear mounted snowplow accessories. As mentioned herein, trucks of different makes can have different dimensions, such as different frame locations and truck bed configurations. Because rear mounted snowplow accessories can be subjected to lateral loads or configured to exert downward forces, the single point connection offered by the conventional trailer hitch or fifth wheel hitch can be insufficient to provide an effective connection. The custom hitch may include more than one connection point, and therefore is considered to offer stability over these conventional standard hitches. However, construction of a custom hitch in many cases is laborious and involves custom fabrication of a construction specific to both the make of vehicle and the snowplow dimensions. Reuse of the custom hitch in connection with a different vehicle make or a different snowplow can be encumbered or impossible without significant effort or rework of the custom hitch. As a result, upgrades to vehicles or snowplows within a fleet of snowplow vehicles can be costly in terms of additional labor to construct new custom hitches.

SUMMARY OF THE DESCRIPTION

The present disclosure is directed toward a vehicle accessory hitch assembly for attaching an accessory to a vehicle. The vehicle may include a frame and a bed mounted to the frame. First and second base rails may be disposed on the bed and coupled to the frame of the vehicle, and the vehicle may include a vehicle trailer hitch with a receiver for accepting a shank. In one embodiment, the vehicle accessory hitch assembly may be mechanically connected to each of the first and second base rails and the vehicle trailer hitch such that the vehicle accessory hitch assembly is immovable or stationary relative to the first and second base rails and the vehicle trailer hitch. In another embodiment, the vehicle accessory hitch assembly may be adaptable to connect to differently-configured base rails and vehicle trailer hitch constructions, including different horizontal and vertical spacing between the base rails and the vehicle trailer hitch.

In one aspect, the vehicle accessory hitch assembly may include a first member opposing a second member, where each of the first and second members includes a bed section and a rear section. The bed section may be configured to extend along the bed of the vehicle, and the rear section may be configured to be in proximity to the rear of the vehicle. Each bed section of the first and second members may fixedly couple to the first and second base rails of the vehicle. The vehicle accessory hitch assembly may include a hitch support fixedly coupled to the rear section of the first member and the rear section of the second member. The hitch support may include a shank member configured to interface with the receiver of the vehicle trailer hitch. With this configuration, the vehicle accessory hitch assembly may be configured to fixedly couple to the first base rail of the vehicle and the second base rail of the vehicle. In one embodiment, the vehicle trailer hitch assembly may be fixedly coupled to these components of the vehicle such that the vehicle accessory hitch assembly is immovable or stationary relative to the first base rail, the second base rail, and the vehicle trailer hitch.

In one embodiment, the vehicle accessory hitch assembly may include an accessory support fixedly coupled to the first member, the second member and the hitch support, where the accessory support may be configured to connect to and support a vehicle accessory near the rear of the vehicle.

The vehicle accessory hitch assembly in one embodiment may be adaptable such that different horizontal and vertical spacing between the base rails and the vehicle trailer hitch may be accommodated. The bed sections of the first and second members may be adjustable in length enabling use of the vehicle accessory hitch assembly with different horizontal spacing between the base rails and the vehicle trailer hitch (or the rearmost part of the vehicle). For example, the spacing between the base rails and the vehicle trailer hitch may be longer for one vehicle than another vehicle. Because the bed sections may be adjustable in length, several different types of vehicle configurations may be used in conjunction with the vehicle accessory hitch assembly. The hitch support of the vehicle accessory hitch assembly may be constructed to allow vertical adjustment of the shank relative to the bed sections of the first and second members. Similar to the distance or spacing between the base rails and the vehicle trailer hitch, the position of the vehicle trailer hitch relative to the bed of the vehicle may be different for one vehicle than another vehicle. In being configured to allow vertical adjustment of the shank, the vehicle accessory hitch assembly may be fitted to both vehicles.

In one aspect, a method of attaching a vehicle accessory hitch to the vehicle includes fixedly coupling a first hitch member to each of the first and second base rails such that the first hitch member is stationary relative to the first and second base rails, where the first hitch member includes a first bed section extending along the bed of the vehicle and includes a first rear section disposed in proximity to a rear of the vehicle.

The method may includes fixedly coupling a second hitch member to each of the first and second base rails such that the first hitch member is stationary relative to the first and second base rails, the second hitch member being in an opposing position relative to the first hitch member, and where the first hitch member includes a second bed section extending along the bed of the vehicle and includes a second rear section disposed in proximity to a rear of the vehicle. The method may also include attaching an accessory support to the first and second hitch members, the accessory support being configured to enable mounting of a vehicle accessory to the vehicle accessory hitch, and inserting a shank member into the receiver of the vehicle trailer hitch to aid in mechanically stabilizing the first and second hitch members relative to the vehicle trailer hitch. The shank member may be stationary relative to the accessory support.

In one aspect, a vehicle accessory hitch assembly may be fitted to several different make and model vehicles, each with potentially different constructions. The vehicle accessory hitch assembly may be adaptable to the different make and model vehicles thereby potentially avoiding fabrication of a custom hitch for each vehicle. Reuse of the vehicle accessory hitch assembly with different vehicles may be possible because the vehicle hitch is adaptable. The vehicle accessory hitch assembly may be mechanically connected to several parts of the vehicle in a manner that withstands substantial transverse loading or in an immovable, stationary manner.

In another aspect, a vehicle accessory hitch for attaching an accessory to a vehicle is provided. The vehicle may include a frame and a bed mounted to the frame, and a vehicle trailer hitch with a receiver for accepting a shank. The vehicle accessory hitch may include a first member and a second member, a hitch support, and an accessory support. The first member may oppose the second member, and each of the first and second members may include a bed section configured to extend from a forward area of the bed to a rearward area of the bed, and a rear section configured to be in proximity to the rear of the vehicle. Each of the bed sections of the first and second members may be configured to couple to the frame of the vehicle (e.g., via a base rail mounted to a surface of the bed and attached to the frame). The hitch support may be coupled to the rear section of the first member and the rear section of the second member. The hitch support may include a shank member configured to interface with the receiver of the vehicle trailer hitch, where the vehicle accessory hitch is configured to couple to the frame of the vehicle via the first and second members and the vehicle trailer hitch of the vehicle. The accessory support may be configured to removably couple to the first member, the second member and the hitch support, and the accessory support may be configured to remain substantially stationary while coupled to the first member, the second member, and the hitch support. The accessory support may be configured to connect to and support a vehicle accessory near the rear of the vehicle.

In one embodiment, the accessory support may be directly coupled to said first member, said second member, and said hitch support. In an alternative embodiment, the vehicle accessory hitch may include an accessory support coupler coupled to the first member, the second member, and the hitch member, wherein the accessory support is coupled to the first member, the second member, and the hitch member indirectly via the accessory support coupler. The accessory support may be removably locked to the accessory support coupler via engagement of a locking member so that the accessory support and an accessory connected to the accessory support may be easily connected to and removed from the vehicle accessory hitch.

These and other advantages and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

Figure 1:
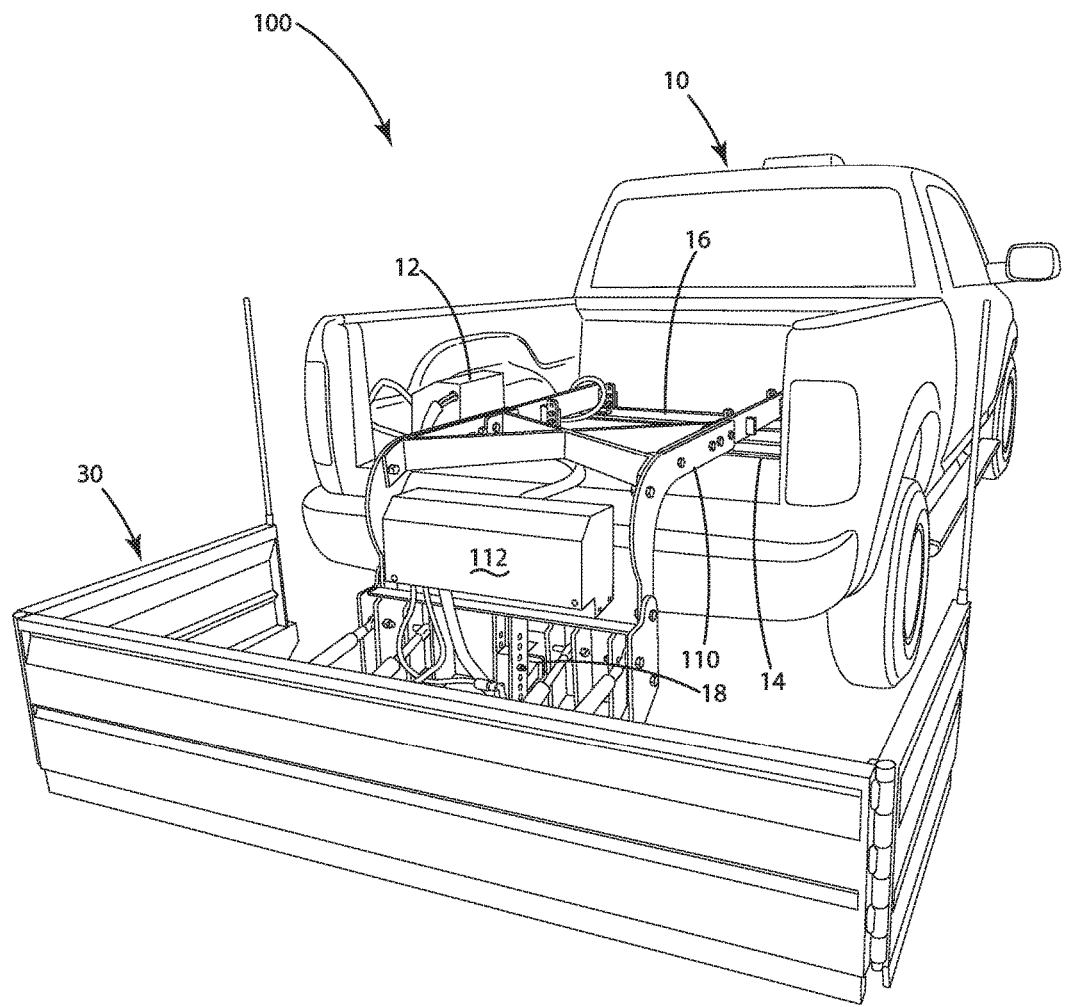
FIG. 1 shows a vehicle accessory hitch assembly according to a current embodiment.

An accessory hitch system for attaching an accessory to a vehicle is shown in FIG. 1, and is generally designated 100. The accessory hitch system 100 includes a vehicle accessory hitch assembly 110, a vehicle 10 and an accessory 30. The vehicle accessory hitch assembly 110 may be connected to the vehicle 10 in a variety of ways, as discussed herein, and may facilitate attachment of the accessory 30 to the vehicle 10. In one aspect, the vehicle accessory hitch assembly 110 may be coupled to the vehicle frame and a vehicle trailer hitch 18 in a fixed manner such that the vehicle accessory hitch assembly 110 is substantially immovable relative to the vehicle frame and the vehicle trailer hitch 18. In another aspect, the vehicle accessory hitch assembly 110 may be adjustable to accommodate different spacing between the frame mounting points and the vehicle trailer hitch. Different vehicle heights may also be accommodated by adjustment.

In the illustrated embodiment, the accessory hitch system 100 may include a control system 12 configured to allow an accessory operator to control operation of the accessory 30, including, for example, enabling control over one or more actuators coupled between the vehicle accessory hitch assembly 110 and the accessory 30. The control system 12 may operate in conjunction with an accessory actuator system 112 to control operation of the accessory 30. The accessory actuator system 112 may be operably connected to the accessory 30 to receive and carry out instructions from the control system 12. The accessory actuator system 112, in one embodiment, may transmit information (e.g., diagnostic information or status information, or both) to the control system 12.

For purposes of disclosure, the accessory 30 is shown as a rear mounted snowplow, but it should be understood that the accessory 30 may be any type of accessory or implement. Some example accessories or implements include cargo carriers, storage boxes, trailers and agricultural implements.

Figure 3:
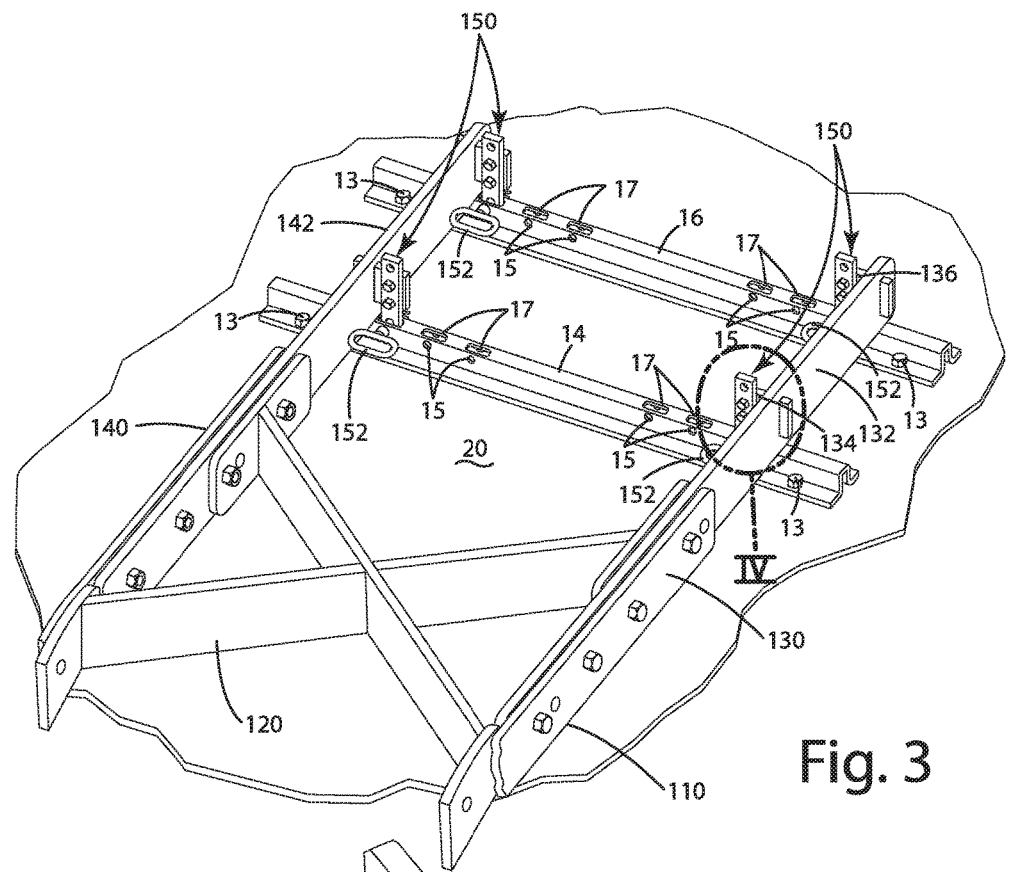
FIG. 3 shows a partial view of the vehicle accessory hitch assembly.
Figure 4:
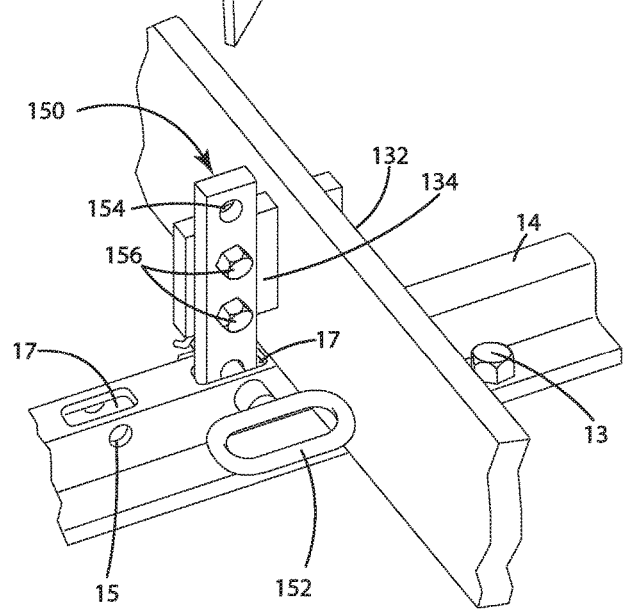
FIG. 4 shows an enlarged view of a connection member of the vehicle accessory hitch assembly of FIG. 3.

In the illustrated embodiment of FIG. 1, and as shown in further detail in FIG. 3, the accessory hitch system 100 may include a first base rail 14 and a second base rail 16 disposed on a bed 20 of the vehicle 10, and coupled to the frame (not shown) of the vehicle. The first and second base rails 14, 16 may include several aperture and hitch pin hole configurations enabling various connection configurations between the first and second base rails 14, 16 and a vehicle accessory hitch assembly 110. Apertures 17 of the first and second base rails 14, 16 may be spaced along the length of the first and second base rails 14, 16, and hitch pin holes 15 may be transversely aligned with the apertures 17 to facilitate a mechanical connection between the first and second base rails 14, 16 and a coupler 150 of the vehicle accessory hitch assembly 110. By having a plurality of apertures 17 and associated hitch pin holes 15, the first and second base rails 14, 16 may accommodate different connection configurations. It should be understood that the first and second base rails 14, 16 may be configured differently to include more or fewer apertures 17 and associated hitch pin holes 15.

In the illustrated embodiment, the apertures 17 of the first and second base rails 14, 16 are configured to receive an end of the coupler 150, which may include a coupler hole 154, 158 that, after being inserted into one of the apertures 17, aligns with the hitch pin holes 15. A hitch pin 152 can be inserted through the hitch pin holes 15 and the coupler hole 154, 158 to form a mechanical connection between the first and second base rails 14, 16 in the vehicle accessory hitch assembly 110.

The first and second base rails 14, 16 may be mechanically coupled to a frame (not shown) of the vehicle 10 using one or more fasteners. In many cases, vehicle manufacturers provide mounting locations for rails, such as the first and second base rails 14, 16, to the vehicle frame. This practice is often implemented in connection with pickup trucks, similar to the pickup truck shown in FIG. 1. The first and second base rails 14, 16 can be fastened to the mounting locations through the bed of the vehicle. In this way, a rigid mechanical connection can be formed between the first and second base rails 14, 16 and the frame of the vehicle 10. Vehicle constructions often differ between makes and models, and so the mounting locations for the first and second base rails 14, 16 for one model vehicle may be different from that of another model vehicle. As a result, the distance between the rear of the vehicle and the mounted position of the first and second base rails 14, 16 may vary among vehicle makes and models. Likewise, the distance between the mounted position of the first and second base rails 14, 16 and the vehicle trailer hitch 18 may vary among vehicle makes and models. As discussed herein, the vehicle accessory hitch assembly 110 may be adjustable to accommodate such variations among vehicle makes and models.

In one embodiment, the first and second base rails 14, 16 may be conventional rails configured to connect with a fifth wheel hitch, such as the conventional fifth wheel rails sold by Reese®, and conventionally known as Reese® fifth wheel rails. In this embodiment, the distance between the first and second base rails 14, 16 may be a standard distance sized to accommodate the conventional mounting spacing for the conventional fifth wheel hitch, which, as discussed above, provides a single point about which an accessory can rotate. Although the spacing between the first base rail 14 and the second base rail 16 may be standard in this embodiment, the distance between (a) the first and second base rails 14, 16 and (b) the rear of the vehicle may vary among vehicle makes and models, as discussed above.

Figure 2:
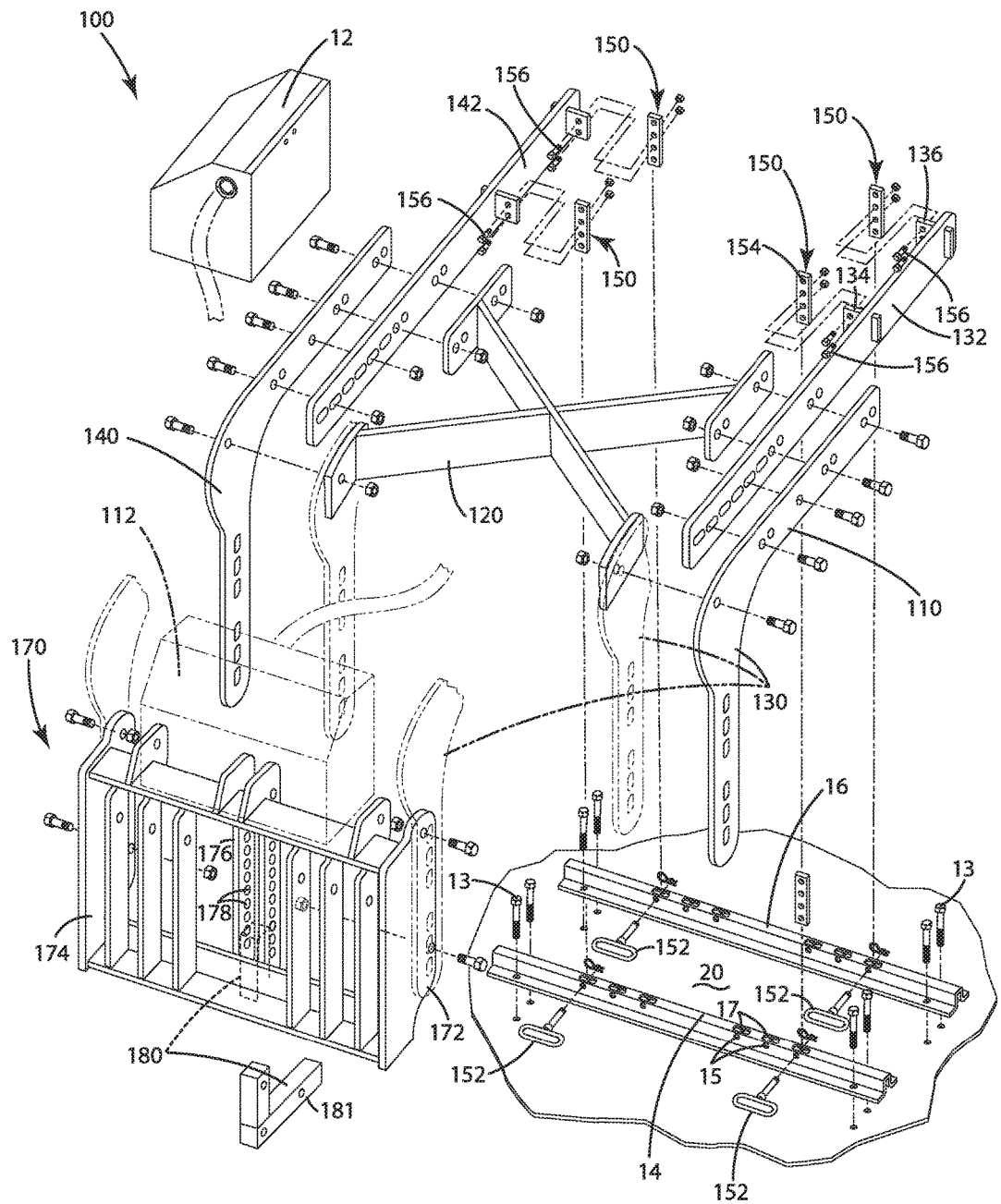
FIG. 2 shows an exploded view of the vehicle accessory hitch assembly.

The vehicle accessory hitch assembly 110 is shown in further detail in the illustrated embodiments of FIGS. 2 and 3. In the illustrated embodiments, the vehicle accessory hitch assembly 110 may include a first beam 130, a second beam 140, a first elongate member 132, a second elongate member 142, a brace 120, an accessory support 170 and a hitch support 180. A vehicle accessory hitch assembly 110 according to one embodiment may enable a rigid, immovable connection between (a) the vehicle accessory hitch assembly 110 and (b) the first base rail 14, the second base rail 16, and the vehicle trailer hitch 18.

The vehicle accessory hitch assembly 110 may be adjustable or adaptable to accommodate different spacing or distances among one or more of the first base rail 14, the second base rail 16, and the vehicle trailer hitch 18. For example, the first beam 130 and the first elongate member 132 may be fastened to each other to form a first hitch member having a bed section disposed in proximity to and extending substantially along the bed 20 of the vehicle 10, and having a rear section in proximity to the rear of the vehicle 10. The rear section of the first hitch member may overhang at least a portion of the rear of the vehicle 10. To accommodate different distances between the first and second base rails 14, 16 and the rear of the vehicle, the bed section of the first elongate member may be variable in length. In particular, the first beam 130 and the first elongate member 132 may be configured to connect to each other in a plurality of positions such that the overall length of the bed section, formed in connecting the first beam 130 in the first elongate member 132, may vary. The second beam 140 and the second elongate member 142 may be constructed in a manner similar to the first beam 130 and the first elongate member 132, and may be fastened to each other to form a second hitch member having a bed section disposed in proximity to and extending along the bed 20 of the vehicle 10, and having a rear section in proximity to the rear of the vehicle 10. The bed sections and the rear sections, or a subset thereof, of the first and second hitch members may be immovably attached to the vehicle 10. Because the first and second hitch members are spaced apart from each other, and/or because each of the first and second members is coupled to the first base rail 14, the second base rail 16, and the vehicle trailer hitch 18, the vehicle accessory hitch assembly 110 may be capable of withstanding transverse loading on the accessory 30, or loading generally parallel to a side of the vehicle 10.

Figure 11:
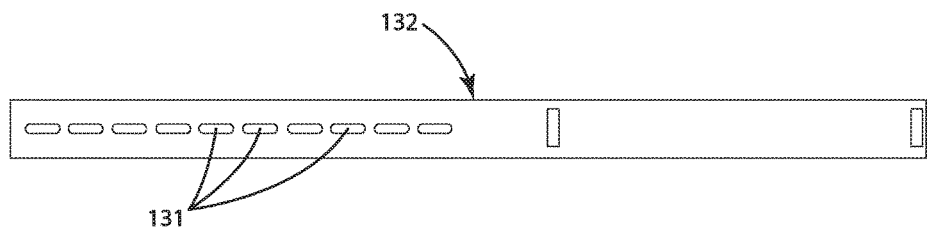
FIG. 11 shows a side view of an elongate member of the vehicle accessory hitch assembly.
Figure 12:
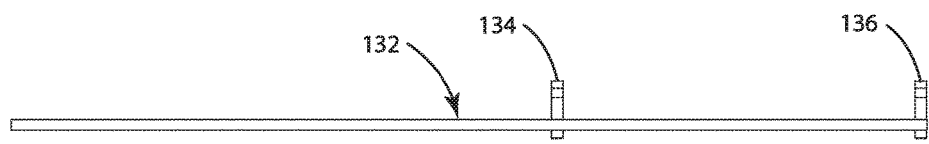
FIG. 12 shows a top view of the elongate member of the vehicle accessory hitch assembly.
Figure 13:
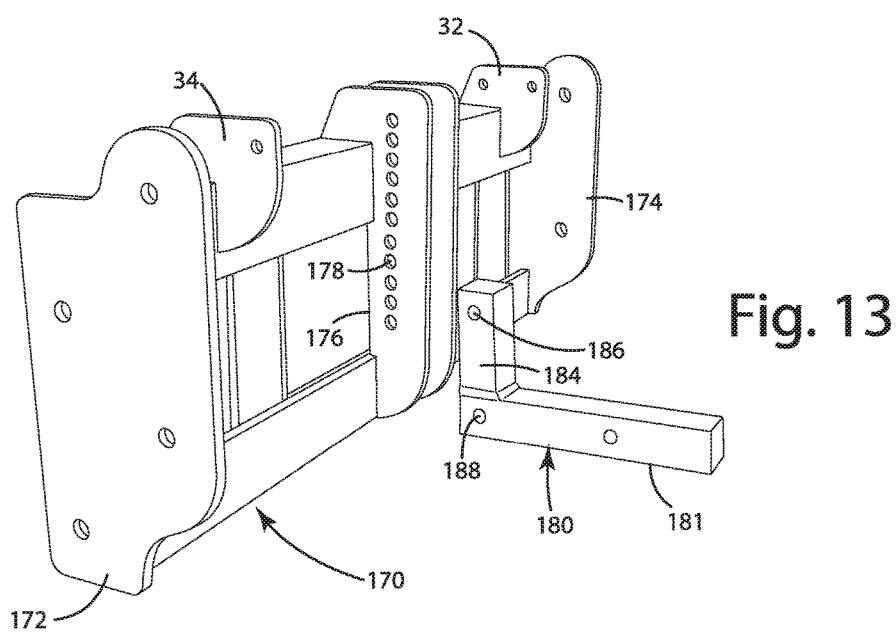
FIG. 13 shows a perspective view of an implement mount and a shank member of the vehicle accessory hitch assembly.
Figure 14:
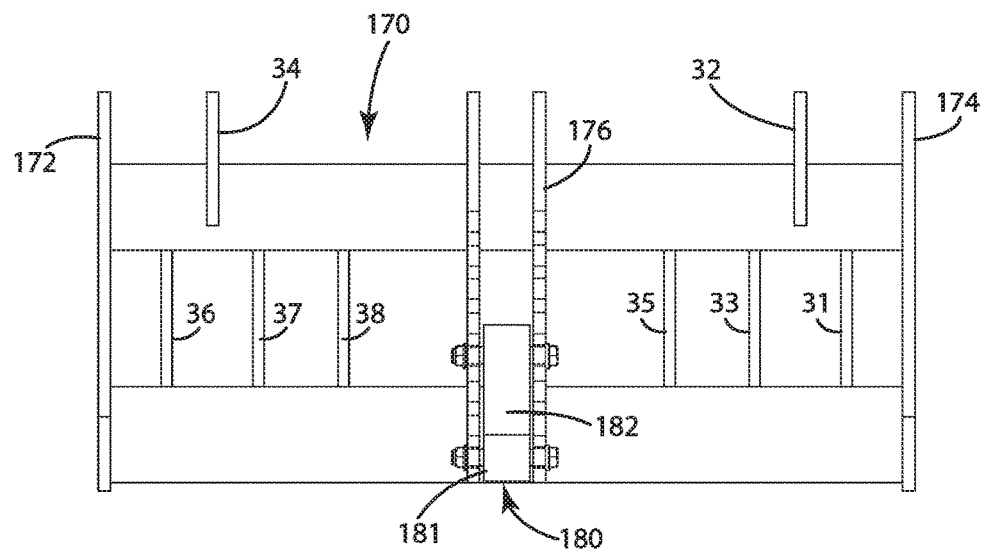
FIG. 14 shows a rear view of the implement mount and the shank member of the vehicle accessory hitch assembly.
Figure 15:
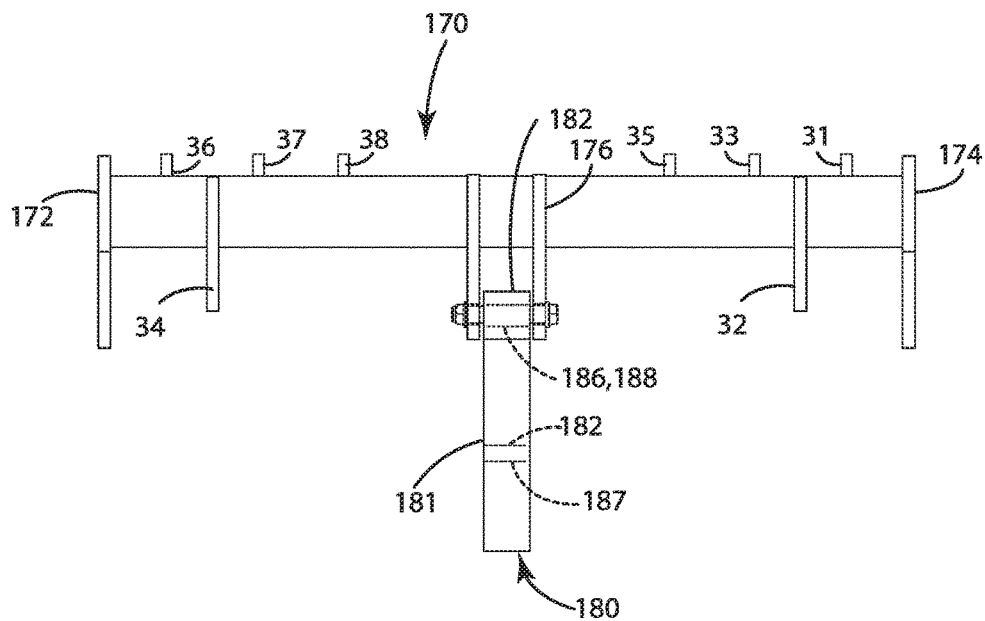
FIG. 15 shows a top view of the implement mount and the shank member of the vehicle accessory hitch assembly.
Figure 17:
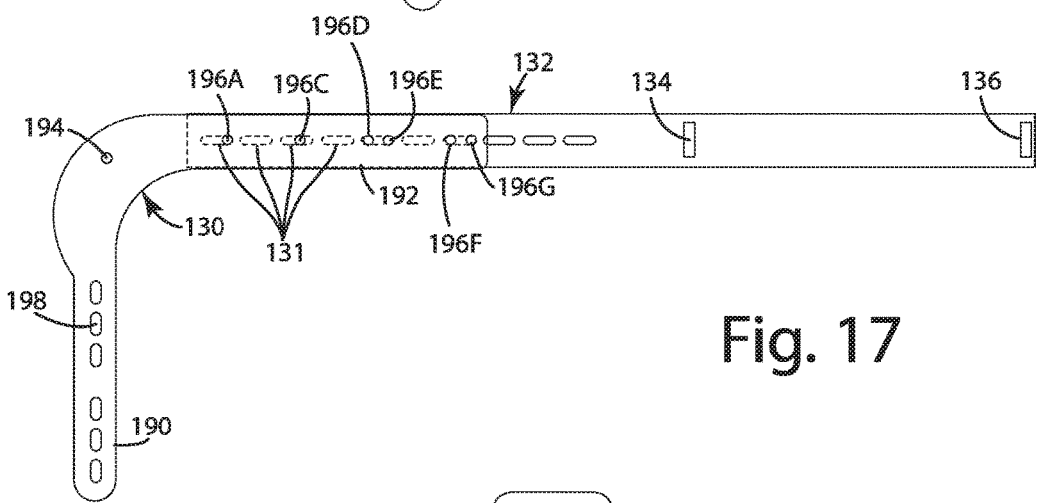
FIG. 17 shows a side view of the beam member and the elongate member of the vehicle accessory hitch assembly.

The first elongate member 132 according to one embodiment is shown in FIGS. 11, 12 and 17. The first elongate member 132 may include a first connection member 134 and a second connection member 136 disposed transverse to a longitudinal axis of the first elongate member 132. In the illustrated embodiment, in manufacturing the first elongate member 132, the first and second connection members 134, 136 may be inserted within respective slots, and then welded in place. The first and second connection members 134, 136 may provide attachment points for connecting the first elongate member 132 to the first and second base rails 14, 16. For example, the first connection member 134 may be fastened to a coupler 150 configured to attach to the first base rail 14 using a hitch pin 152, as discussed herein. And, the second connection member 136 may be fastened to another coupler 150 configured to attach to the second base rail 16 using a hitch pin 152, as discussed herein. It should be understood that the present disclosure is not limited to a particular type of coupling or connection between the first elongate member 132 and the first and second base rails 14, 16, and that any type of coupling or connection may be used.

Figure 18:
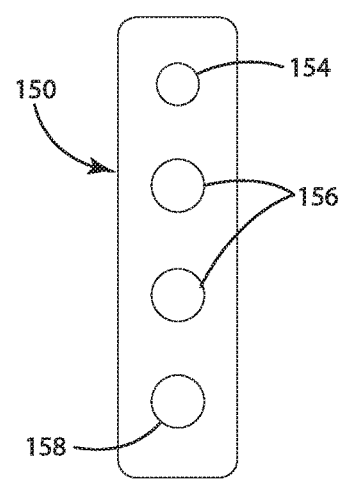
FIG. 18 shows a coupler of the vehicle accessory hitch assembly.

In the illustrated embodiment of FIGS. 11 and 18, the first elongate member 132 may include a plurality of slots 131. The plurality of slots 131 may be spaced from one another along the longitudinal axis of the first elongate member 132. In this way, the plurality of slots 131 may provide a plurality of locations along the longitudinal axis at which the first elongate member 132 can be connected to the first beam 130. In the illustrated embodiment, the plurality of slots 131 are each approximately 2 inches in length, and spaced approximately 1 inch from each other along the longitudinal axis of the first elongate member 132. The length of the slots 131 and the spacing therebetween may vary depending on the configuration.

Figure 5:
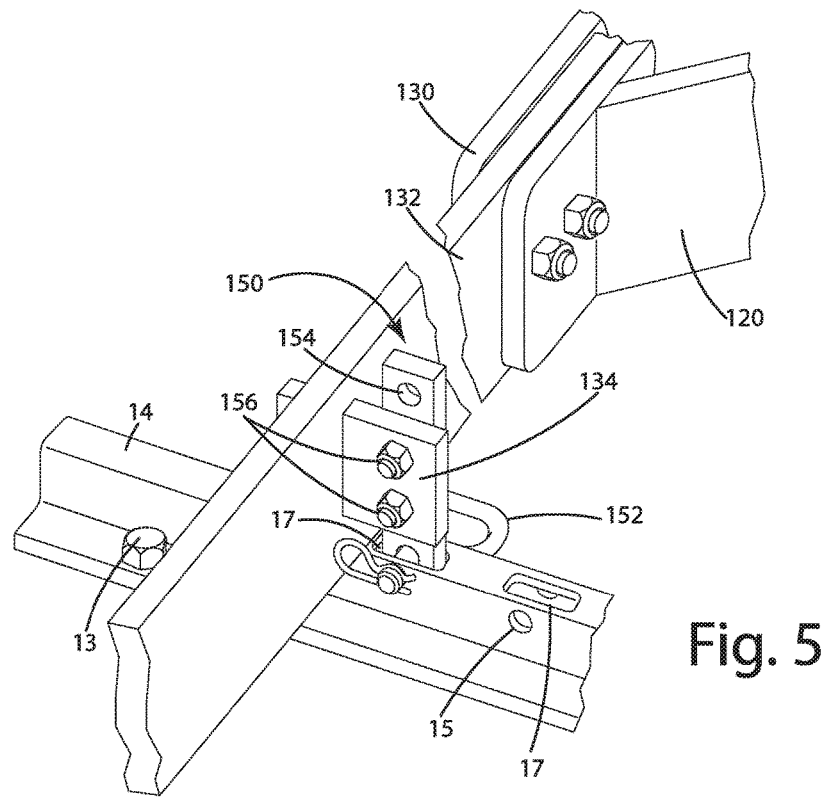
FIG. 5 shows an enlarged, perspective view of the connection member of FIG. 4.
Figure 6:
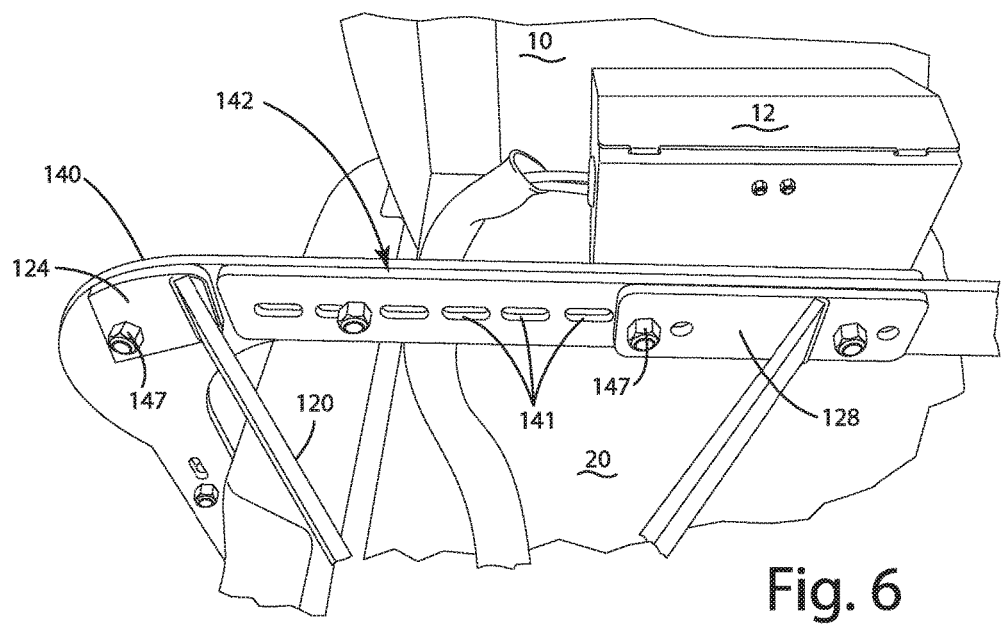
FIG. 6 shows a partial, perspective view of the vehicle accessory hitch assembly.
Figure 7:
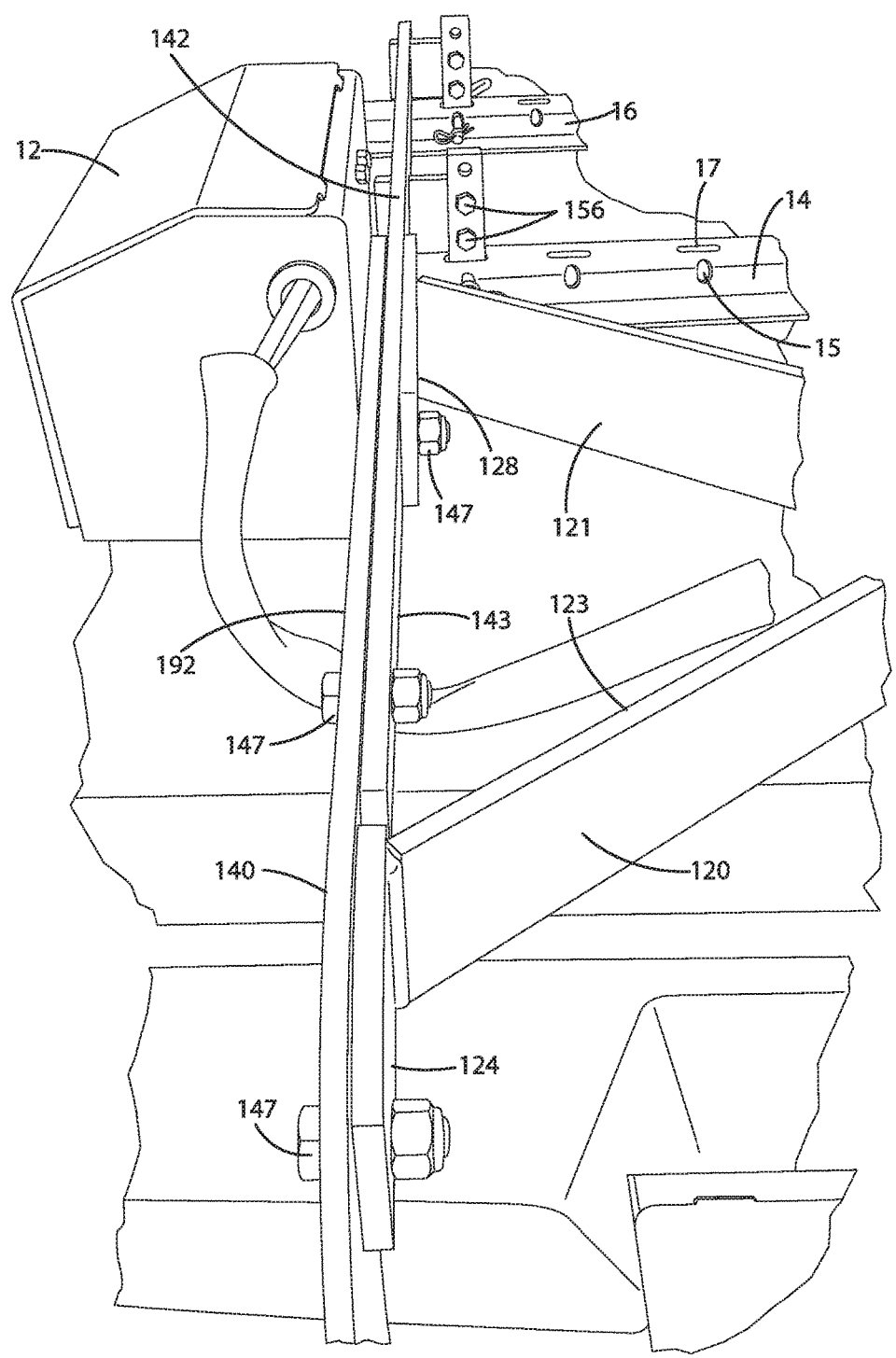
FIG. 7 shows a partial, perspective view of the vehicle accessory hitch assembly.
Figure 8:
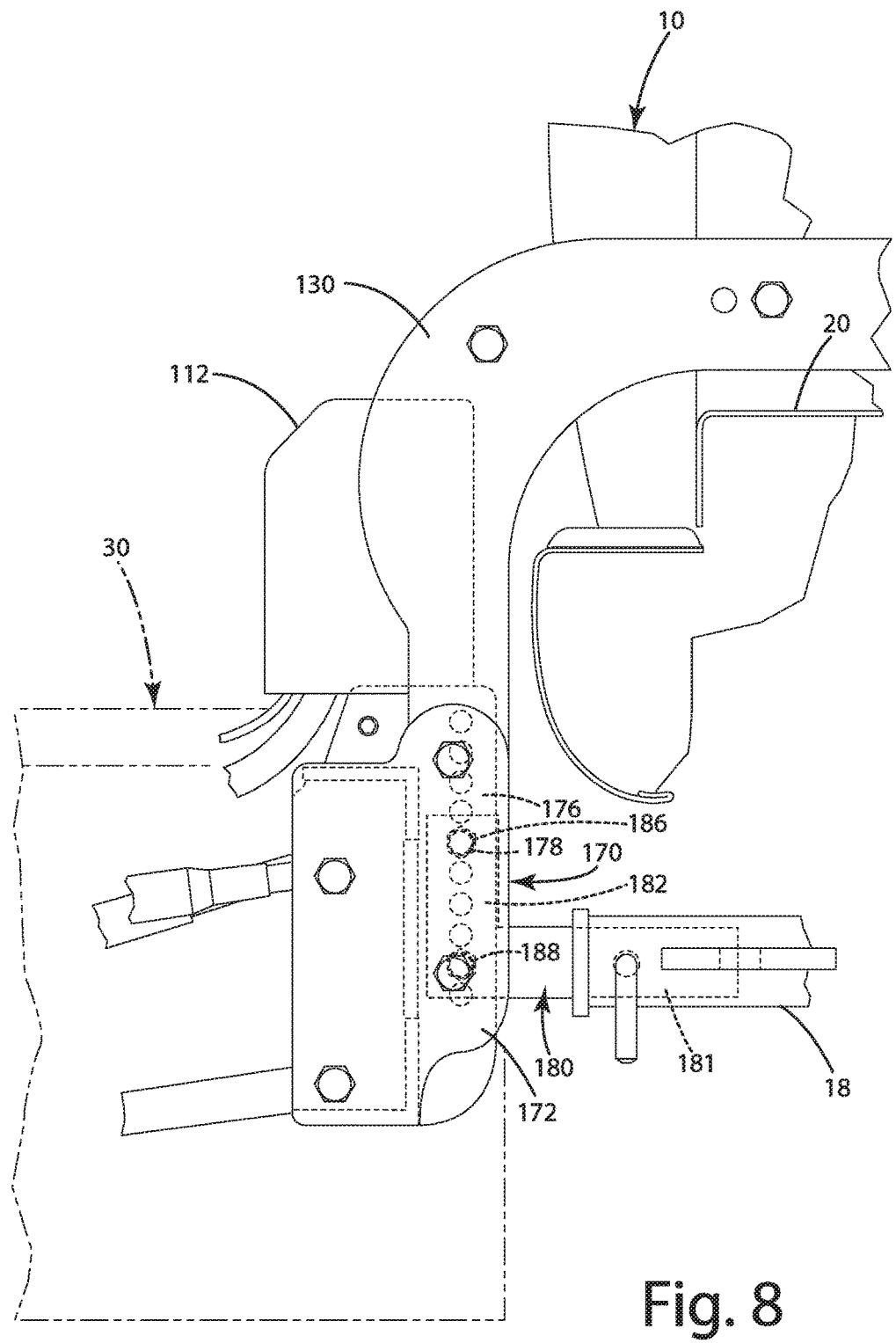
FIG. 8 shows a partial side view of the vehicle accessory hitch assembly.

A second elongate member 142, in one embodiment, may be substantially identical to the first elongate member 132, and is shown connected to a second beam 140 in the illustrated embodiments of FIGS. 5 and 6 in a manner similar to the connection between the first elongate member 132 and the first beam 130. The first elongate member 132 may be symmetrical about the longitudinal axis such that, by flipping the first elongate member 132, the first elongate member 132 may be used as the second elongate member 142, and may be mounted to the first and second base rails 14, 16 in proximity to the bed 20 in a manner that opposes the first elongate member 132. As a result, the first and second elongate members 132, 142 can be respectively manufactured as one component.

The first beam 130 according to one embodiment is shown in FIGS. 17 and 18. In the illustrated embodiment, the first beam 130 may comprise a bed member 192 and a support member 190. The bed member 192 may be constructed to be fastened to the first elongate member 132 such that the bed member 192 is substantially aligned with the longitudinal axis of the first elongate member 132. The support member 190 and the bed member 192 may form a right angle such that, when installed on the vehicle 10, the bed member 192 is in proximity to the rear of the vehicle and substantially perpendicular to a plane defined by the bed 20 or the ground over which the vehicle 10 is disposed. It should be understood that the present disclosure is not limited to a right angle or perpendicular configuration, and that the angle between the bed member 192 and the support member 190 may vary from configuration to configuration. For example, among different constructions, the angle may vary from 0° to 100° relative to the longitudinal axis of the bed member 192. In practical terms, the support member 190 may be configured in any manner that enables the vehicle accessory hitch assembly 110 to be attached to the first and second base rails 14, 16 and the vehicle trailer hitch 18.

The first beam 130 may include a plurality of mounting holes 196A-G spaced apart from one another, and capable of interfacing with a fastener, such as a bolt and nut, to fasten the first beam 130 the first elongate member 132. The plurality of mounting holes 196 A-G may be spaced in a manner to correspond with the plurality of slots 131 so that at least two of the mounting holes 196 A-G may be aligned with corresponding slots 131 irrespective of the relative position between the first beam 130 and the first elongate member 132. In other words, in one embodiment, over a range extending from the longest to shortest configuration of the bed section formed by the first beam 130 and the first elongate member 132, the positions of the plurality of slots 131 and the mounting holes 196A-G may enable substantially unlimited adjustability while enabling a substantially firm mechanical connection therebetween. In the illustrated embodiment, the mount holes 196A-B are 2 inches apart, center to center. Likewise, the mounting holes 196D-E and the mounting holes 196F-G are respectively 2 inches apart, center to center. The mounting holes 196B-C, the mounting holes 196C-D and the mounting holes 196E-F are respectively 8 inches apart, center to center. It should be understood that the spacing among the mounting holes 196A-F may vary from application to application.

The support member 190 of the first beam 130 may include a plurality of slots 198 configured to align with mounting holes of the accessory support 170 so that the accessory support 170 can be fastened to the first beam 130. The plurality of slots 198 may be generally spaced and configured in a manner similar to the slots 131. However, at least two of the plurality of slots 198 may have a different spacing from the other plurality of slots 198 to facilitate adjustability in mounting the accessory support 170 relative to the first beam 130.

The first beam 130 may also include a brace mounting hole 194 that aligns with a corresponding mounting hole in the brace 120 so that the brace 120 can be affixed to the first beam 130 using a fastener, such as a bolt and nut 147.

Figure 16:
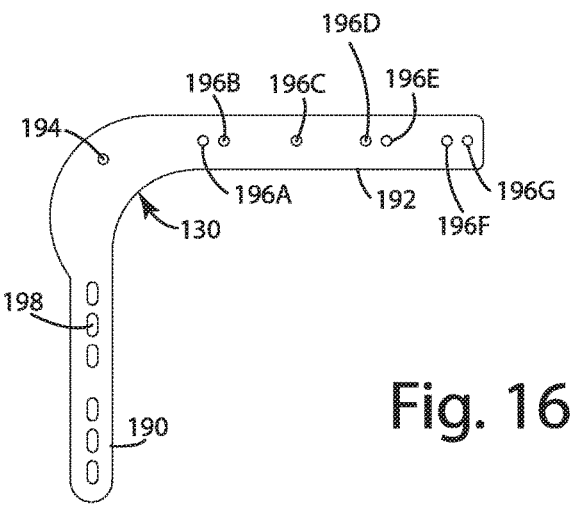
FIG. 16 shows a side view of a beam member of the vehicle accessory hitch assembly.

In the illustrated embodiment, the transition between the bed member 192 and the support member 190 is continuous or formed without the use of a mechanical joint between the bed member 192 in the support member 190. The inside and outside radiuses of the transition, in the illustrated embodiment of FIG. 16, may be different so that additional material may be incorporated into the transition, thereby strengthening the transition between the bed member 192 and the support member 190. In this way, a mechanical joint between the bed member 192 and the support member 192 may be avoided, and the first beam 130 can be manufactured with the bed member 192 and the support member 190 as a single component.

Similar to the first and second elongate members 132, 142, the first beam 130 may be substantially identical to the second beam 140. As a result, the first beam 130 and the second beam 140 may be interchangeable. It should be understood, however, that, like the first and second elongate members 132, 142, the first and second beams 130, 140 may be configured differently from each other.

Figure 9:
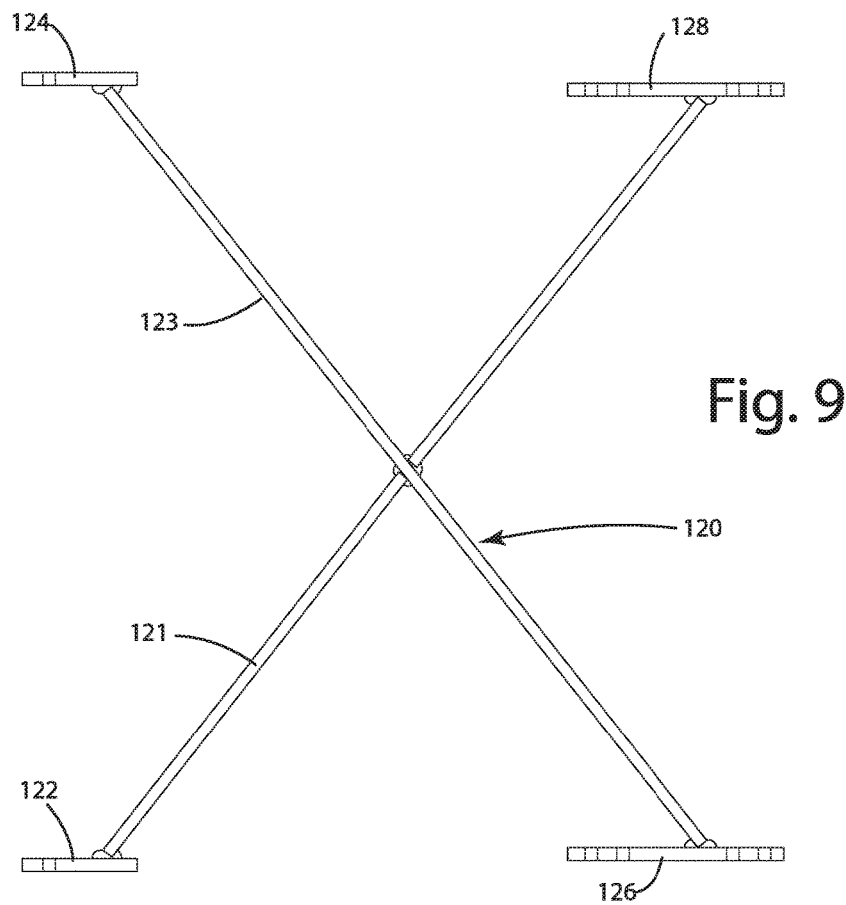
FIG. 9 shows a top view of a brace of the vehicle accessory hitch assembly.
Figure 10:
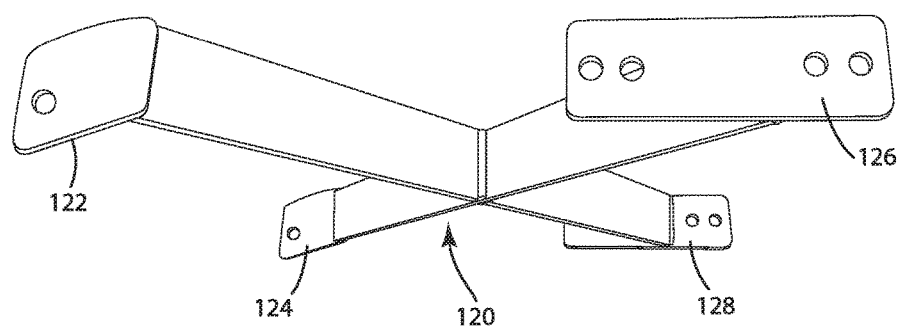
FIG. 10 shows a perspective view of the brace of the vehicle accessory hitch assembly.

In the illustrated embodiment of FIGS. 3 and 9-10, the vehicle accessory hitch assembly 110 includes a brace 120 disposed between (a) the first beam 130 and the first elongate member 132 and (b) the second beam 140 and the second elongate member 142. The brace 120 may be sized to couple to inside, opposing faces of the first elongate member 132 and the second elongate member 142, and to couple to inside opposing faces of the first beam 130 and the second beam 140. The brace 120 may be formed by overlapping and welding two members 121, 123 in a cross-halved joint configuration. Each end of the members 121, 123 may be connected to a mounting plate 122, 124, 126, 128. In the illustrated embodiment, the mounting plates 126, 128 are configured to be mechanically fastened to the first and second elongate members 132, 142, respectively. And, the mounting plates 122, 124 are configured to be mechanically fastened to the first and second beams 130, 140, respectively. As discussed herein, the vehicle accessory hitch assembly 110 may be configured to resist transverse loading, or loads applied in a direction perpendicular to a side of the vehicle 10. Incorporation of the brace 120, and its attachment to the first and second elongate members 132, 142 and the first and second beams 130, 140 may further strengthen the vehicle accessory hitch assembly 110 against such transverse loading. The mounting plates 122, 124, 126, 128 may include mounting holes configured and spaced in a manner similar to the mounting holes described herein in connection with the first and second elongate members 132, 142 and the first and second beams 130, 140.

In the illustrated embodiments of FIGS. 2, 8 and 13-15, the accessory support 170 of the vehicle accessory hitch assembly 110 is shown in further detail. The accessory support 170 may include a first end plate 172, a second end plate 174, and a shank mount 176 (or a hitch support mount for connecting to the hitch support 180, 380) that is disposed between the first end plate 172 and the second end plate 174. In the illustrated embodiment, the hitch support 180 may be coupled to the first and second beams 130, 140 (or aspects thereof) via the hitch support mount—although it should be understood that the present disclosure is not so limited. In the illustrated embodiment, the hitch support 180 is formed of a substantially straight member capable of being received by the vehicle trailer hitch 18—although the hitch support 180 may be configured differently such as the L-shaped hitch support 180 in the illustrated embodiment of FIG. 8.

The first end plate 172 may be affixed to the support member 190 of the first beam 130, and the second end plate 174 may be affixed to the support member 190 of the second beam 140. It should be understood that these components can be affixed together in a variety of ways; in the illustrated embodiment, a bolt and nut fastener in conjunction with slots and mounting holes are used. However, the present disclosure is not so limited. With the accessory support 170 being mounted to the support members 190 of the first and second beams 130, 140, the accessory support 170 may be positioned near the rear of the vehicle 10. In particular, in one embodiment of this configuration, the accessory support 170 may be positioned and held at the rear of the vehicle 10.

To further support the vehicle accessory hitch assembly 110, including the accessory support 170, a hitch support 180 may be affixed to the shank mount 176 of the accessory support 170, and may include a shank 181 receivable by the vehicle trailer hitch 18. With this configuration, the hitch support 180 may mechanically connect the accessory support 170 to the vehicle trailer hitch 18, thereby coupling the vehicle accessory hitch assembly 110, and components thereof, to the vehicle trailer hitch 18.

As discussed herein, the support members 190 of the first and second beams 130, 140 may include a plurality of slots 198 configured to accept a fastener, such as a bolt and nut fastener, that allow formation of a mechanical connection between the support members 190 and the first and second end plates 172, 174 of the accessory support 170. The first and second end plates 172, 174 may include corresponding mounting holes configured to align with one or more of the slots 198 so that the mechanical connection may be formed.

The distance between the bed 20 of the vehicle 10 and the vehicle trailer hitch 18 may vary from application to application. For example, this distance for one make and model vehicle may be different from another make and model vehicle. Because this distance may vary, when the first and second elongate members 132, 142 and the first and second beams 130, 140 are coupled to the first and second base rails 14, 16, the distance from the bed sections of this configuration to the vehicle trailer hitch 18 may also vary.

In an effort to achieve an adaptable vehicle accessory hitch capable of being adjusted for use with more than one vehicle make and model, the hitch support 180 may be mountable in a plurality of positions relative to the shank mount 176 of the accessory support 170. The plurality of available positions for the hitch support 180 in conjunction with the accessory support 170 being mountable in a plurality of positions to the first and second beams 130, 140 may enable the accessory support 170 and the hitch support 180 to be positioned so that the shank 181 of the hitch support 180 may be aligned with and received by the vehicle trailer hitch 18. The shank 181 may include a vehicle hitch pin hole 187 configured to align with a corresponding set of holes in the vehicle trailer hitch 18, and to accept a hitch pin to secure the shank 181 within the vehicle trailer hitch 18. To provide a plurality of mounting positions for the hitch support 180, a mounting member 182 of the hitch support 180 may include a plurality of mounting holes 186, 188 capable of being aligned with one or more corresponding mounting holes 178 disposed in the shank mount 176 of the accessory support 170.

It should be understood the plurality of mounting positions available for the accessory support 170 and the hitch support 180 may enable alignment of the shank 181 of the hitch support 180 to the vehicle trailer hitch 18. It should also be understood that there may be several combinations of positions for the accessory support 170 and the hitch support 180 that achieve such alignment. In installing the accessory support 170 and the hitch support 180, the ultimate position used may depend not only on alignment of the shank 181 with the vehicle trailer hitch 18, but also, in some circumstances, may depend on a desired height of the accessory support 170 relative to the ground. For example, in installation, the type of accessory 30 being installed on the accessory support 170 may be known and have particular installation parameters, such as a required ground clearance or a specific mounting configuration. The accessory support 170 may be positioned to accommodate the installation parameters of the accessory 30 being installed.

In an effort to allow use of several different types of accessories 30, accessory support 170 of the vehicle accessory hitch assembly 110 may include a plurality of accessory mounts 31-38 disposed at several locations on the accessory support 170. The accessory mounts 31-38 may accommodate different connection configurations between an accessory 30 and the accessory support 170. As a result, a first accessory having a first type of connection configuration may be connected to the accessory support 170, and a second accessory having a second type of connection conversion may also be connected to the accessory support 170.

The mechanical connection between the first and second elongate members 132, 142 and the first and second base rails 14, 16 according to one embodiment is shown in FIGS. 3, 4, 5 and 18. The connection members 134, 136 of the first elongate member 132 may be fastened via fasteners 156 to a coupler, such as the coupler 150 in the illustrated embodiment of FIG. 18.

The coupler 150 may include one or more coupler holes that accept a hitch pin 152. The coupler 150 may be sized to fit within an aperture 17 of the first and second base rails 14, 16. Once received, the hitch pin 152 may be slid through a corresponding hitch pin hole 15 of the first and second base rails 14, 16 and the coupler hole of the coupler 150, thereby forming a mechanical connection between the first and second base rails 14, 16 and the respective coupler 150. Several mechanical connections of this type may be achieved through the use of multiple couplers 150, as depicted in the illustrated embodiment of FIG. 3.

In some circumstances, there may be multiple standard sizes for the hitch pin holes 15 of the first and second base rails 14, 16. As a result, there is the possibility that the coupler hole of the coupler 150 may be undersized or oversized for the first and second base rails 14, 16 used in a particular configuration. To accommodate different sizes, the coupler 150 may be constructed with multiple coupler holes 154, 158 having different sized apertures at each end. Other than the different sized coupler holes 154, 158, the coupler 150 may be generally symmetric. In this way, the coupler 150 according to one embodiment may be flipped or rotated, prior to fastening to the connection members 134, 136, to accommodate the base rails to which the vehicle accessory hitch assembly 110 is being connected.

An accessory hitch system for attaching an accessary to a vehicle is in accordance with one or more embodiments is shown in FIGS. 19-27, and generally designated 200. The accessory hitch system 200 may be similar to the accessory hitch system 100 but with several exceptions. In the illustrated embodiment, the accessory hitch system 200 includes a vehicle 10 and an accessory 30, similar to the accessory hitch system 100, and a vehicle accessory hitch assembly 210 similar in some but not all respects to the accessory hitch system 100.

The accessory hitch system 200 may be adjustable or adaptable to accommodate different spacing among one or more components of the vehicle 10. The accessory hitch system 200, similar to the accessory hitch system 100 in the illustrated embodiment of FIG. 2, may be connected to the vehicle 10 in a variety of ways to facilitate attachment of the accessory to the vehicle. For instance, the accessory hitch system 200 may include one or more of the following: the first beam 130, the second beam 140, the second elongate member 142, the brace 120, and the hitch support 380. These components are provided in the accessory hitch system 200 in the illustrated embodiment of FIG. 19, and may be configured to couple to the first and second base rails 14, 16, similar to the vehicle accessory hitch system 100. It should be understood that the accessory hitch system 200 may be constructed differently from the illustrated embodiment such as by including more or fewer of the components identified as being similar to the vehicle accessory hitch system 100. The accessory hitch system 200 may be configured to In the illustrated embodiment, the vehicle accessory hitch assembly 210 includes an accessory support 300 configured to couple (optionally fixedly couple) to the first beam 130, the second beam 140 and the hitch support 380. The accessory support 300 may be constructed to couple to an accessory support coupler 270 of the vehicle hitch assembly 210. The accessory support coupler 270 may be mechanically connected to the hitch support 380, the first beam 130 and the second beam 140. For instance, the accessory support coupler 270 may be mechanically fastened to the hitch support 380 via one or more bolts and nuts, to the first beam 130 via one or more bolts and nuts, and to the second beam 140 via one or more bolts and nuts. In this way, the accessory support coupler 270 may fixedly connect to the hitch support 380, the first beam 130, and the second beam 140. In the illustrated embodiment, the accessory support coupler 270 is shown directly connected respectively to the hitch support 380, the first beam 130, and the second beam 140—however, it should be understood that one or more of these connections may be indirect such that the accessory support coupler 270 is connected to one or more of the hitch support 380, the first beam 130, and the second beam 140 via another respective component. As an example, the accessory support coupler 270 may be coupled to the hitch support 380 indirectly via a connection to the first beam 130 and the second beam 140, both of which may be connected directly to the hitch support 380. The accessory support coupler 270 may be similar to the accessory support 170 of the vehicle accessory hitch assembly 110 in some respects, including, for example, the accessory support coupler 270 being configured connect directly and fixedly to one or more of the hitch support 380, the first beam 130 and the second beam 140 in a manner similar to the accessory support 170.

The accessory support 300 may be similar to the accessory support 170 but with several exceptions, including being configured for easy removal from the accessory support coupler 270. Similar to the accessory support 170, the accessory support 300 of the illustrated embodiments may include one or more mounting points for connecting various types of accessories depending on the application. An example of this configuration is the connection of a rear snowplow as shown in the illustrated embodiment of FIG. 24.

Figure 19:
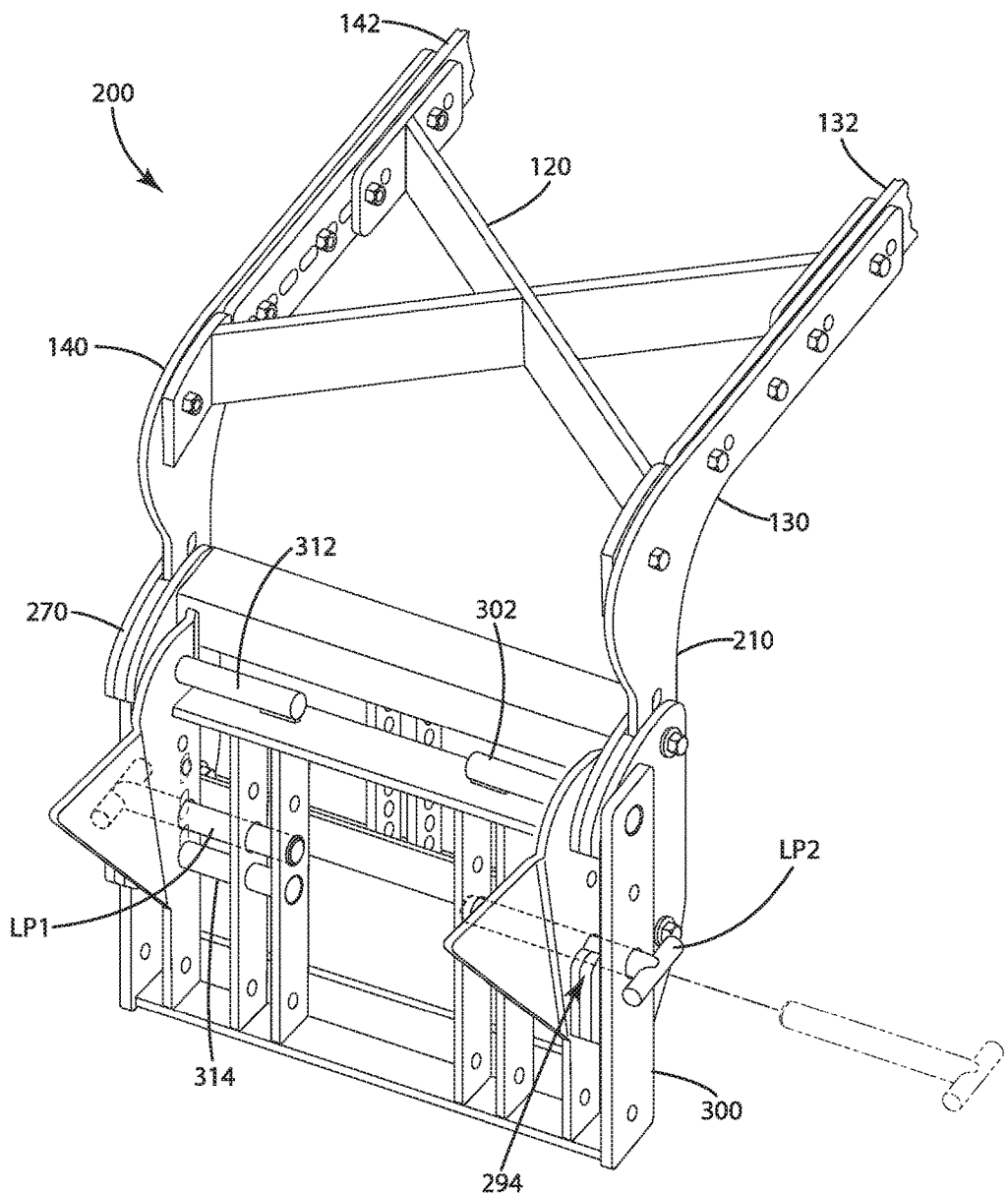
FIG. 19 shows a vehicle accessory hitch assembly according to an alternative embodiment.

The accessory support coupler 270 in the illustrated embodiment of FIG. 19 may be removably coupled to the accessory support 300 in a manner that allows easy connecting and disconnecting of the accessory support 300. It should be understood that several of the couplings or connections between components described herein are removable-type couplings or connections. For instance, the accessory support 170 described in connection with the vehicle accessory hitch system 100 may be removably coupled to the hitch support 380 via removal and installation of nuts and bolts. The accessory support 300 in the illustrated embodiment may be coupled or decoupled to the accessory support coupler 270 more easily than otherwise possible with nuts and bolts. The hitch support 380 may be similar in some respects to the hitch support 180, including for example a shank 181 and being capable of being adjustably coupled (e.g., fastened) to the hitch support coupler or shank mount 176.

To provide another example, one or more support receptacles of the accessory support coupler 270 may be configured to receive one or more support surfaces of the accessory support 300. A latch (e.g., a slide latch, a bolt or pin) may engage one or more latch receptacles to substantially maintain the position of the one or more support receptacles relative to the one or more support surfaces. This engagement may facilitate maintaining a position of the accessory support 300 relative to the accessory support coupler 270, thereby coupling the two together. Disengagement of the latch from the one or more latch receptacles may enable removal of the accessory support 300 from the accessory support coupler 270.

To provide a more specific example, the accessory support 300 may be coupled to the accessory support coupler 270 by fitting an upper pin and a lower pin of the accessory support 300 respectively with an upper receptacle and a lower receptacle of the accessory support coupler 270 and installing a locking pin LP through a first locking pin receiver of the accessory support 300 and a second locking pin receiver of the accessory support coupler 270.

It should be understood that any of the one or more support receptacles of the accessory support coupler 270 may be configured to accept a locking pin receiver or a latch to facilitate locking the accessory support 300 to the accessory support coupler 270, and likewise, any of the locking pin receivers of the accessory support 300 and/or the accessory support coupler 270 may be configured as a support receptacle for receiving an upper member 302 or a lower member 304 to facilitate maintaining the coupling between the accessory support 300 and the accessory support coupler 270. As an example, the upper receptacle 290 of the accessory support coupler 270 may be configured to accept a locking pin LP1, whereas the locking pin receiver 294 may be configured as a receptacle that accepts a support member (e.g., an upper member 302). As discussed herein, with the accessory 30 in a raised position (e.g., a snow plow in the raised position), the weight of the accessory 30 is primarily supported by the locking pin receiver 294. In cases, where the weight of the accessory 30 is significant (e.g., a snow plow and salt spreader with a hopper that is fully loaded), the locking pin receiver 294 may be configured as a support receptacle that accepts a support member—as shown in the illustrated embodiment of FIG. 20, the locking pin receiver 294 may be configured to accept a support member with no modification. This way, the system in accordance with one embodiment may avoid loading only the locking pin LP1 with significant weight or force. The locking pin LP1 in this example may be accepted by the upper receptacle 290 and a second locking pin may be accepted by the lower receptacle 292 to facilitate locking the accessory support 300 to the accessory support coupler 270. It should be understood, as described herein and for purposes of disclosure, that several of the examples and descriptions of embodiments focus on the left side or right side of the accessory support 300 and the accessory support coupler 270, and that the other side may be configured in a similar or the same manner but mirrored.

The one or more support receptacles of the accessory support coupler 270 may be defined by the upper receptacle and the lower receptacle of the accessory support coupler 270, and the upper pin and the lower pin of the accessory support 300 may include the one or more support surfaces received by the one or more support receptacles. The locking pin LP1 may be a locking member or a latch that engages the one or more receptacles, which are the first and second locking pin receivers 294, 296 in the illustrated embodiment of FIG. 19.

Disengagement of the locking pin LP1 (e.g., removal of the locking pin LP1) may facilitate removal of the accessory support 300 with respect to the accessory support coupler 270. Using the locking member to engage the receivers 294, 296, the accessory support 300 may be locked and unlocked with respect to the accessory support coupler 270. It should be noted that, for purposes of discussion, the locking pins LP1, LP2 are shown being capable of removal from the accessory support 300 and the accessory support coupler 270—however, in practice, the locking pins LP1, LP2 may be coupled to a spring, a cage, and a rotatable stop that allows the locking pins LP1, LP2 to be removed from the locking pin receivers 294, 296 and rotated to a disengaged position where the rotatable stop prevents re-engagement of the locking pin receivers 294, 296. The cage and spring may facilitate maintaining the locking pins LP1, LP2 in the disengaged position or an engaged position in which the locking pins LP1, LP2 engage the locking pin receivers 294, 296.

The accessory hitch system 200 in the illustrated embodiments of FIGS. 19-27 includes the accessory support coupler 270 as discussed herein. The accessory support coupler 270 may include a first endplate 272, a second end plate 274, and hitch support mount 276. The first end plate 272 may be fastened to the first beam 130 and the second end plate 274 may be fastened to the second beam 140. The hitch support mount 276 may be fastened to the hitch support 180. Bolts and nuts are shown in connection with fastening these components—but it should be understood that a different fastening system may be utilized for fastening one or more of these components. With this arraignment, as depicted in the illustrated embodiment of FIG. 23, the accessory support coupler 270 may be disposed near the rear of the vehicle 10.

The accessory support coupler 270 in the illustrated embodiment includes supplemental end plates 278 and spacer plates 280 that facilitate forming a mechanical connection between the first and second end plates 272, 274 and the first and second beams 130, 140, respectively. It should be understood that the supplemental end plates 278 and/or the spacer plates 280 are optional. The supplemental end plates 278 may sandwich a beam 130, 140 in conjunction with an end plate 272, 274 in order to form a rigid mechanical connection with the beam 130, 140. The spacer plates 280 may be positioned between the supplemental end plate 278 and the end plate 272, 274 in spaces in which the beam 130, 140 is not present, thereby enhancing the rigidity of the connection to the beam 130, 140. In one embodiment, the supplemental end plates 278, the spacer plates 280 and the end plate 272, 274 may be welded together for rigidity. In one embodiment, the beam 130, 140 may be integral with the end plate 272 such that aspects of the end plate 272 are integral to the beam 130, 140.

Figures 20, 21:
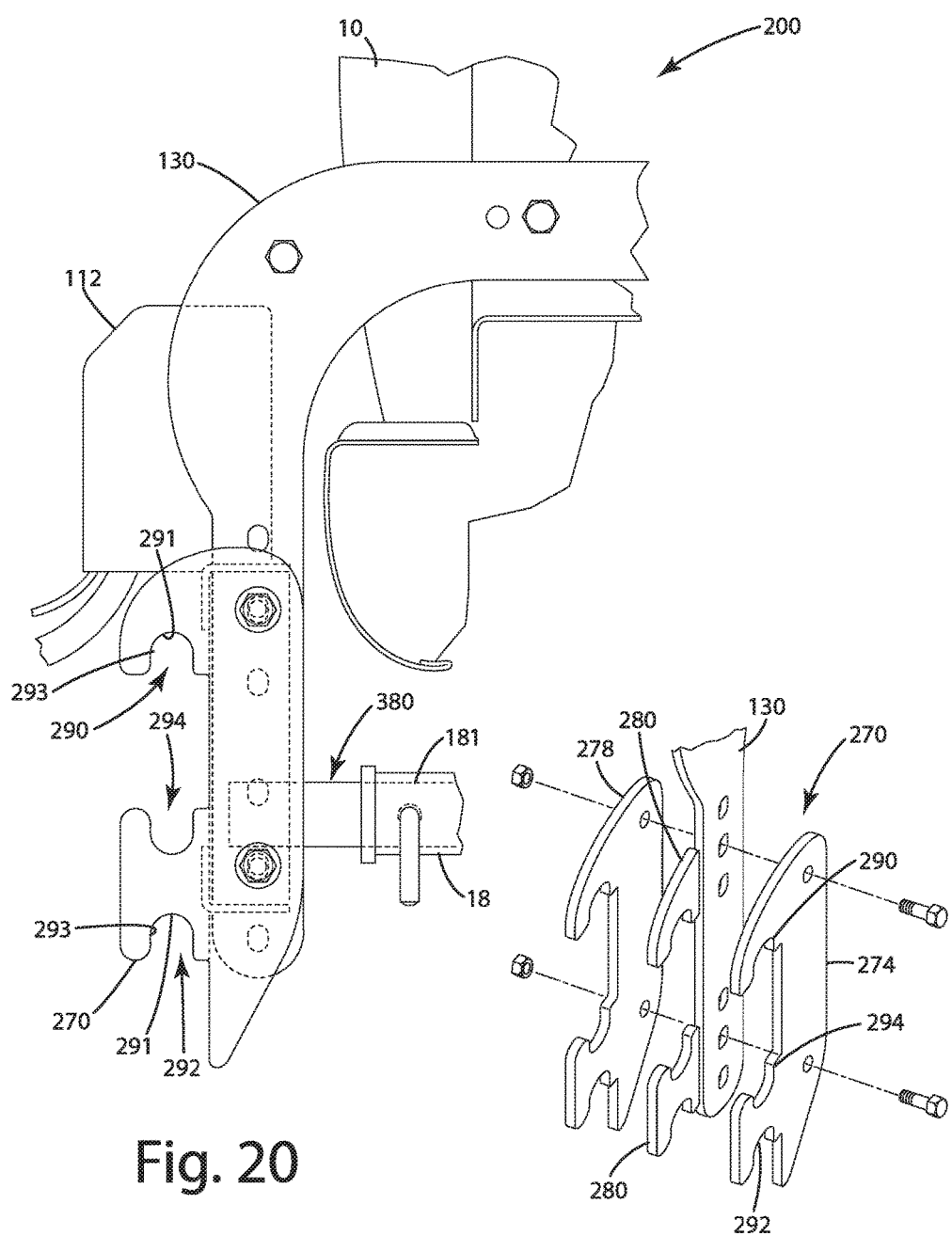
FIG. 20 shows a side view of the vehicle accessory hitch assembly in accordance with one embodiment.
FIG. 21 shows a perspective view of an accessory support coupler in accordance with one embodiment.
Figure 22:
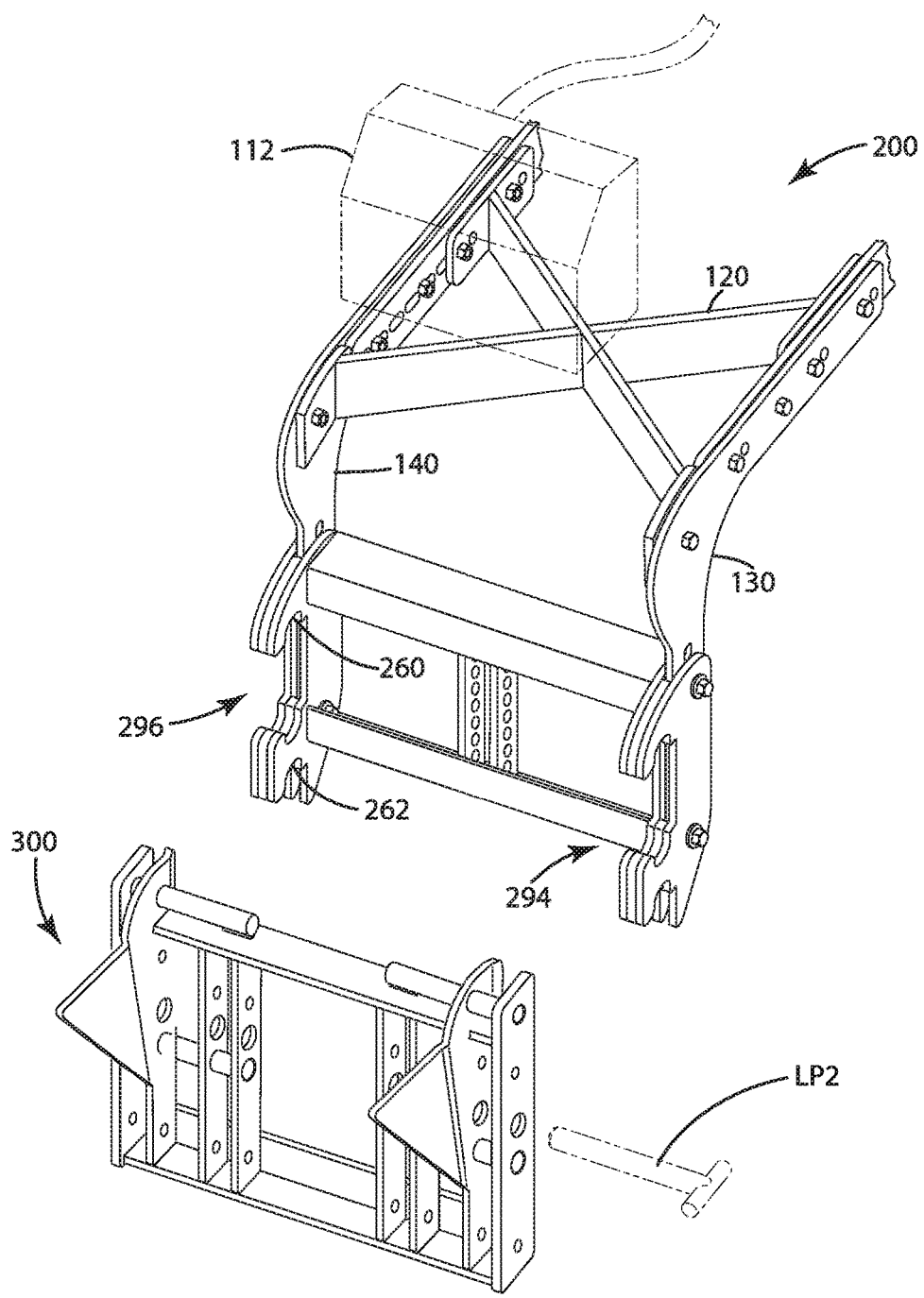
FIG. 22 shows an exploded perspective view of the vehicle accessory hitch assembly in accordance with one embodiment.
Figure 23:
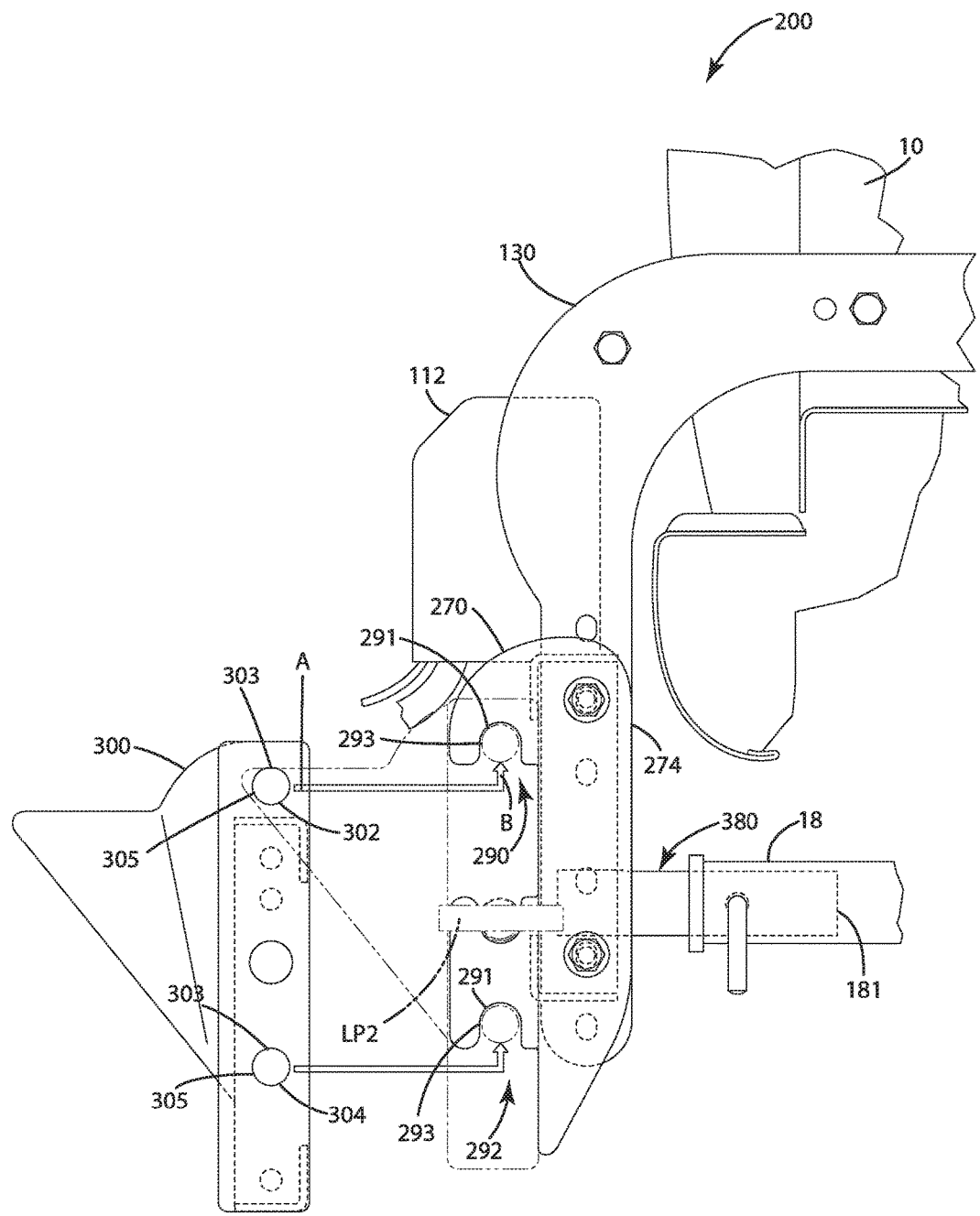
FIG. 23 depicts a side view of the vehicle accessory hitch assembly in accordance with one embodiment.

The end plate 272, 274 in the illustrated embodiments of FIGS. 21-23 includes an upper receptacle 290 and a lower receptacle 292. The upper receptacle 290 and the lower receptacle 292 may be receptacles constructed to interface with a support surface of the accessory support 300. In this way, the upper receptacle 290 may be an upper receptacle, and the lower receptacle 292 may be a lower receptacle. For purposes of disclosure, aspects of the upper receptacle 290 are described in further detail. It should be understood that the lower receptacle 292 may be configured similarly—although the present disclosure is not limited to the configurations being similar.

In the illustrated embodiment of FIG. 23, the upper receptacle 290 and the lower receptacle 292 of the end plate 272, 274 is constructed to respectively engage an upper support member 302, 312 and a lower support member 304, 314. In the illustrated embodiment the first end plate 272 corresponds to the left side of the vehicle accessory hitch assembly 210 and the second end plate 274 corresponds to the right side of the vehicle accessory hitch assembly 210. The end plates 272, 274 may engage corresponding left and right upper support members 302, 312 and corresponding left and right lower support members 304, 314. Although shown primarily as a bar or hollow cylinder (e.g., a round or square cylinder shape or bar), the present disclosure of the support member 302, 304, 312, 314 is not so limited. Any one or more of the support members described herein may be configured differently. For instance, the support member 302 may not be cylindrical and instead may be integrated with part of the accessory support 300 such that the support member 302 forms an "L" shape with a finger that engages the upper receptacle 290.

In the illustrated embodiment of FIG. 23, the upper member 302 may include an upper support surface 303 and a lateral support surface 305 configured to interface with one or more surfaces of the upper receptacle 290. The upper receptacle 290 may include an upper receptacle surface 291 constructed to interface with the upper support surface 303 of the upper member 302 and a lateral receptacle surface 293 constructed to interface with the lateral support surface 305 of the upper member 302. In a similar manner, the lower member 304 may include an upper support surface 303 and a lateral support surface 305 that respectively interface with an upper receptacle surface 291 of the lower receptacle 292 and a lateral receptacle surface 293 of the lower receptacle 292. Engagement with the upper receptacle surfaces 291 and/or the lateral receptacle surfaces 293 of the upper receptacle 290 and the lower receptacle 292 may facilitate maintaining a connection between the accessory support 300 and the accessory support coupler 270.

As can be seen in the illustrated embodiment of FIG. 23, the upper member 302 and the lower member 304 of the accessory support 300 may be installed by disposing both the upper member 302 and the lower member 304 respectively into the upper receptacle 290 an the lower receptacle 292. This can be seen in the movement from position A to position B. In position B, both the upper member 302 and the lower member 304, without engagement of the locking pin receivers 294, 296, may be freely moved from position B to position A for removal of the accessory support 300 from the accessory support coupler 270. In position B, as perhaps more easily seen in the illustrated embodiment of FIG. 19, the locking pins LP1, LP2 may be slid or disposed respectively in the first and second locking pin receivers 294, 296 of the accessory support coupler 270 and first, second, third and fourth right hand support receivers 330, 331, 332, 333 and first, second, third, and fourth left hand support receivers 340, 341, 342, 343 of the accessory support 300. Engagement of the locking pins LP1, LP2 with the first and second locking pins receivers 294, 296, as can be seen more easily in FIGS. 23-27, may prevent downward movement of the accessory support 300 from position B, thereby maintaining the positions of the upper member 302 and the lower member 304 of the accessory support 300 in the upper and lower receptacles 290, 292. With this configuration, it should be noted that lowering the accessory to contact the ground causes the upper member 302 and lower member 304 of the accessory support 300 to respectively contact the upper and lower receptacles 290, 292 and relieves the load of the locking pins LP1, LP2 on the locking pin receivers 294, 296. This lowered position may enable easy removal of the locking pins LP1, LP2 due to relief of the load on the locking pin receivers 294, 296.

Figure 24:
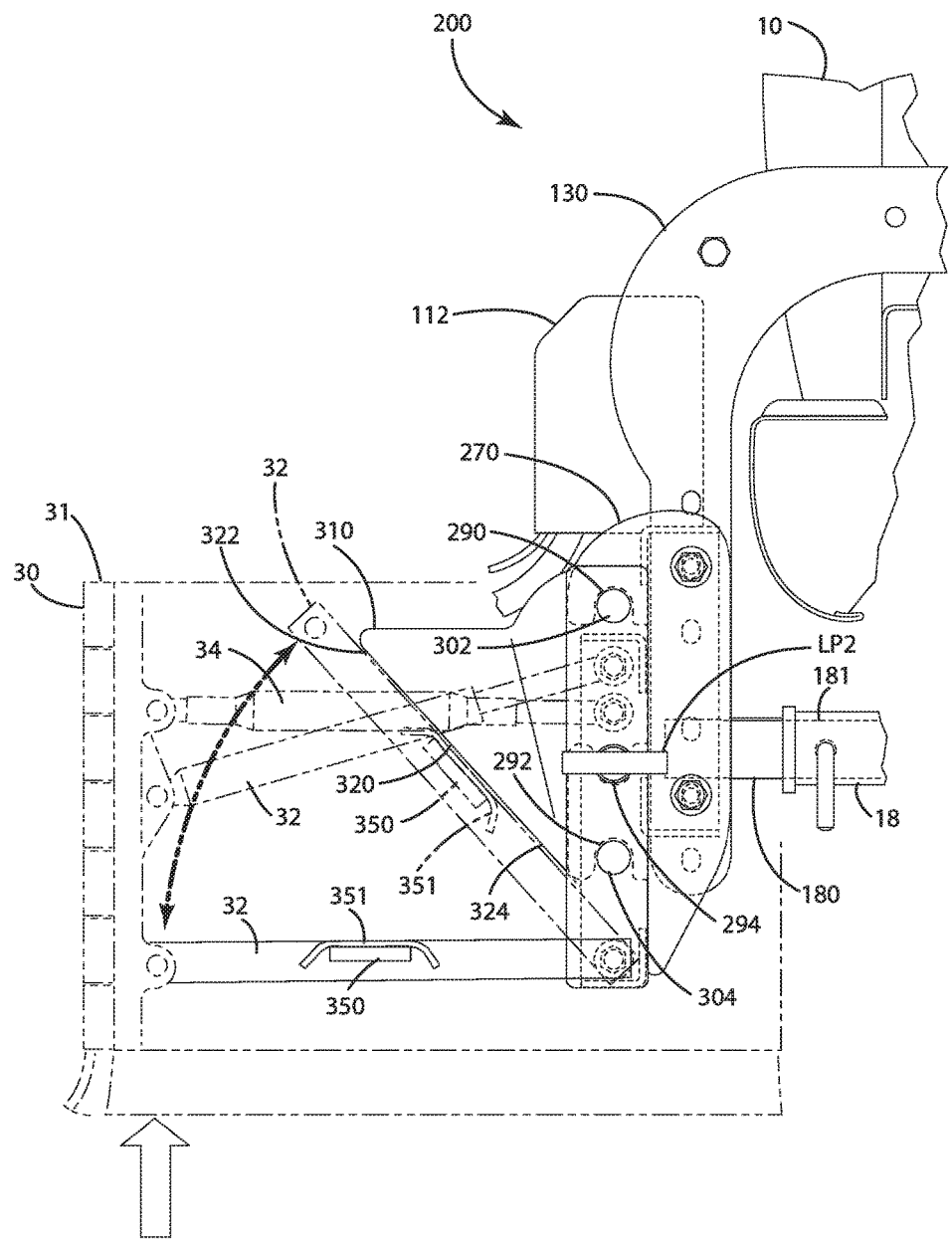
FIG. 24 shows a side view of the vehicle accessory hitch assembly in conjunction with a rear snowplow in accordance with one embodiment.
Figure 25:
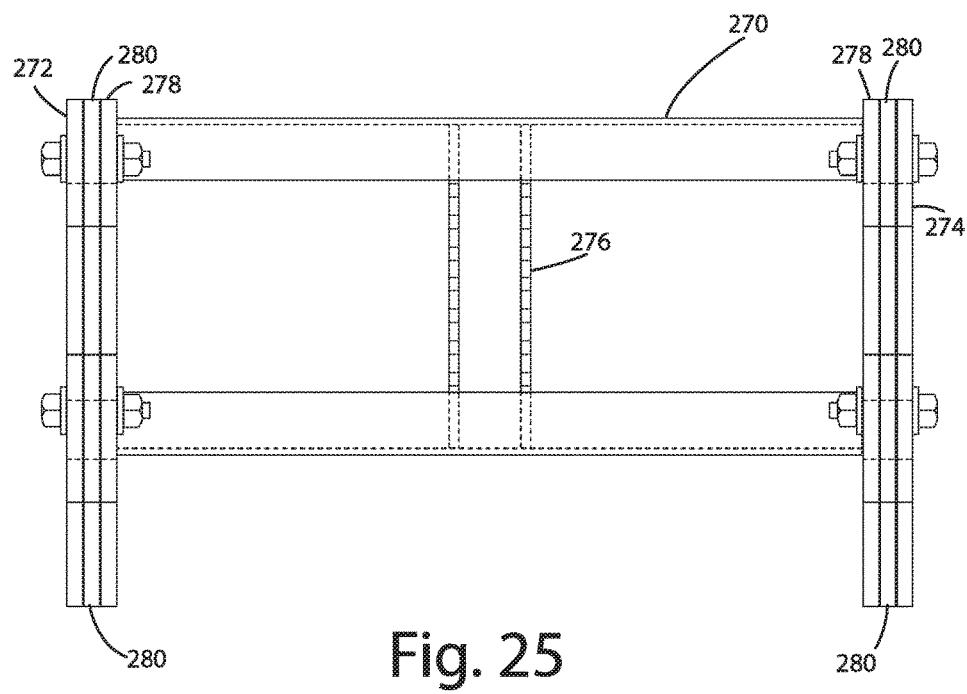
FIG. 25 shows a front view of the accessory support coupler in accordance with one embodiment.
Figure 26:
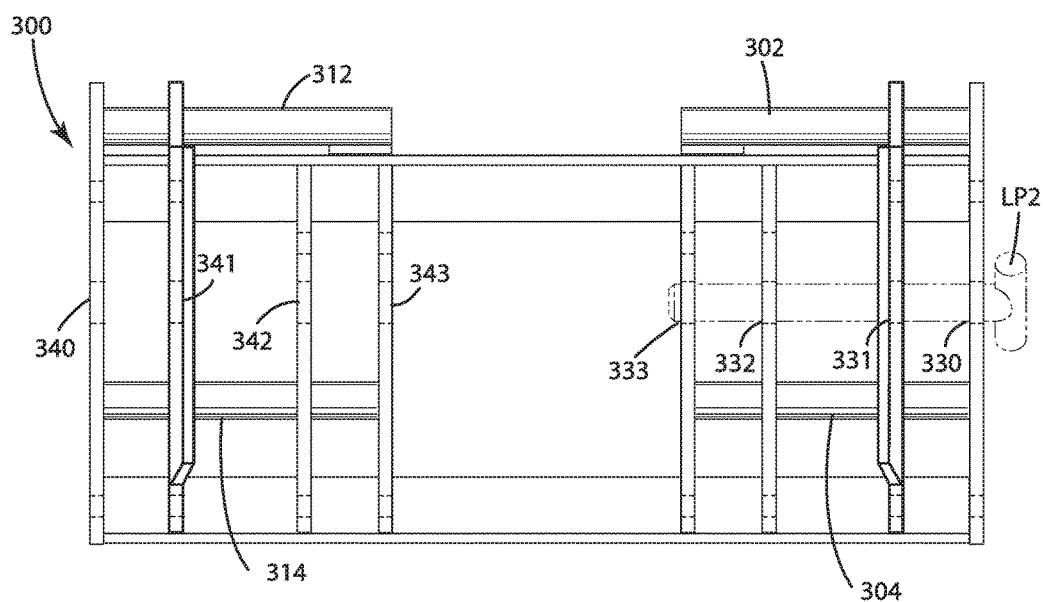
FIG. 26 shows a front view of an accessory support in accordance with one embodiment.
Figure 27:
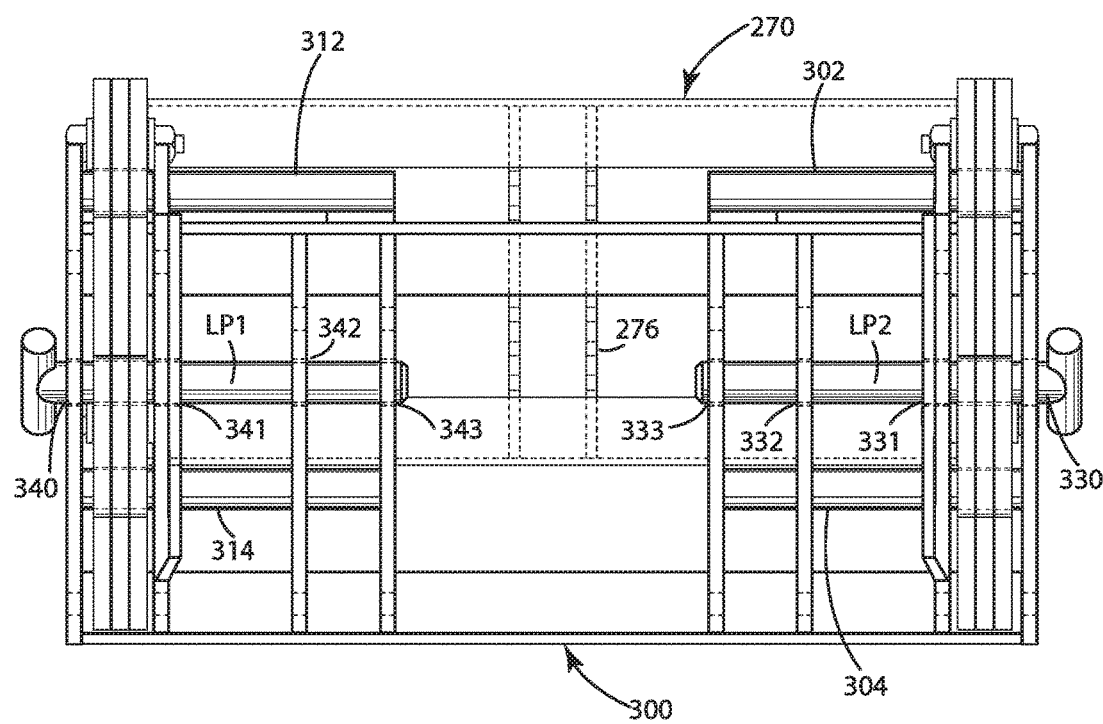
FIG. 27 shows a front view of the accessory support and the accessory support coupler in a coupled configuration in accordance with one embodiment.

In the illustrated embodiments of FIGS. 23 and 24, the accessory support 300 is shown being connected to or already connected to the accessory support coupler 270. With the accessory 30 in a raised position (e.g., no ground contact), the first and second locking pins LP1, LP2 and the first and second locking pin receivers 294, 296 may be configured to bear most or all of the downward force of the accessory 30 and the accessory support 300, or to carry the accessory 30 and the accessory support 300 in the raised positon. The upper and lower members 302, 304 may operate in conjunction with the upper and lower receptacles 290, 292 to substantially prevent lateral movement or rotation of the accessory support 300. For instance, the lateral receptacle surface 293 of the upper receptacle 290 and the lateral support surface 305 of the upper member 302 may engage and prevent rotation of the accessory support 300 and the accessory in the raised position.

In some configurations, such as in the case of the accessory 30 being a rear snow plow, a raised position of the accessory 30 generates less force on the accessory support coupler 270 than a lowered position of the accessory 30 (e.g., with ground contact). For instance, in a lowered position with ground contact, the accessory 30 may exert more upward force on the accessory support coupler 270 than the downward force exerted by the accessory 30 in the raised position. For this reason, the accessory support coupler 270 may be configured such that both the upper receptacle 290 and the lower receptacle 292 respectively engage the upper and lower members 302, 312 to bear the upward force due to ground contact. With reference to one side (e.g. the right side), there are two primary points of upward contact in this arrangement—the upper receptacle surfaces 291 of the upper and lower receptacles 290—as opposed to a one primary point of downward contact with the locking pin LP2. The other side (e.g., the left side) in the illustrated embodiment is configured in a similar manner with two primary points of upward contact between a) the upper receptacle surfaces 291 of the upper receptacle 260 and the lower receptacle 262 and b) the upper support surfaces 303 of the upper member 312 and the lower member 314.

Figure 28:
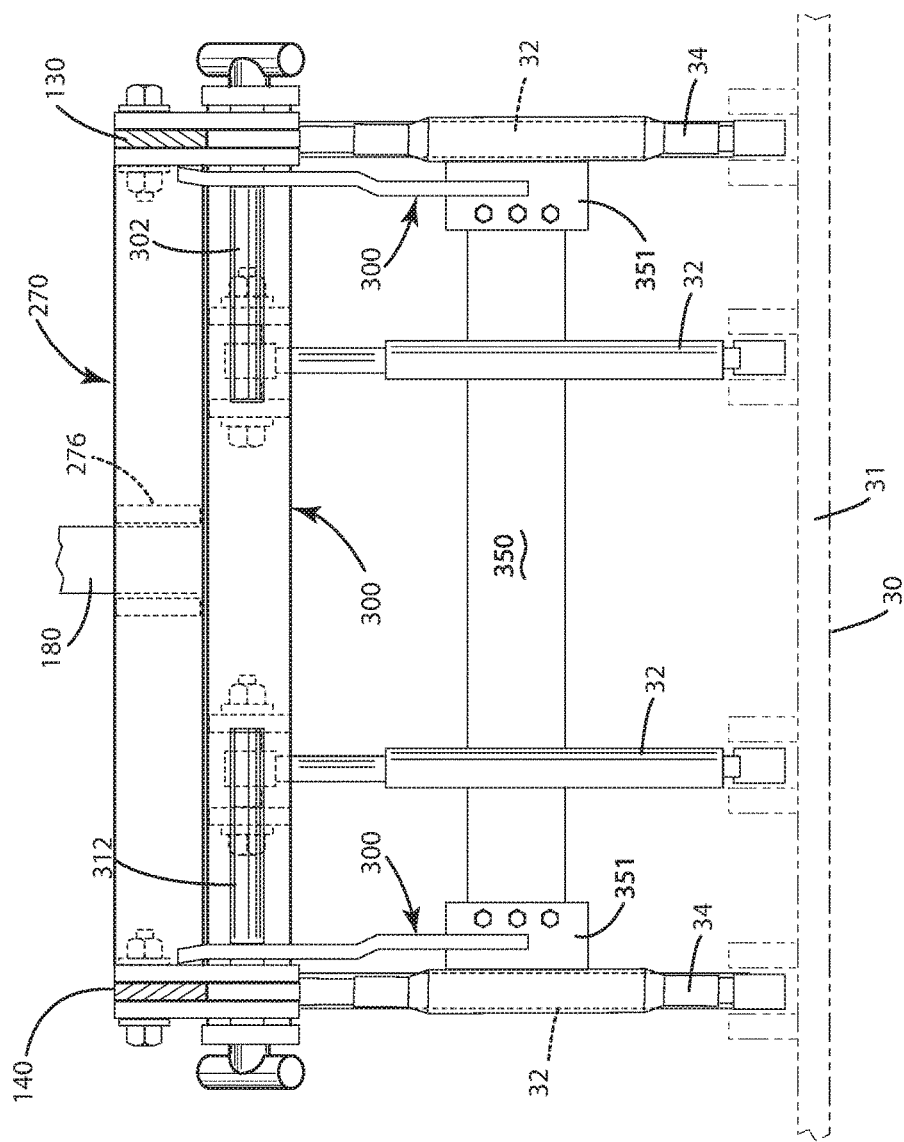
FIG. 28 shows a top view of the accessory support and the accessory support coupler in accordance with one embodiment.

In the illustrated embodiment of FIG. 24, the accessory hitch system 200 includes an accessory stop 310. The accessory stop 310 may include a stop surface 320 configured to interface with a stabilizer 350 of an accessory 30. The accessory 30, as depicted in the illustrated embodiments of FIGS. 24 and 28, may include a frame 31 to which the linkages 32 and the actuators 34 are coupled. The frame 31 may be constructed to include the stabilizer 350 or a frame member of the frame 31. The stabilizer 350 may be constructed as a unitary frame member or a plurality of separate frame members, and may be configured to contact the stop surface 320 in a fully raised position of the accessory 30. The stabilizer 350 may include a linkage connector 351 that couples the stabilizer 350 to the left and right linkages 32, thereby enabling the stabilizer 350 to raise and lower with the linkages 34 as the actuators 32 move the accessory 30. The stop surface 320 may operate as a hard stop for the stabilizer 350 when being raised to a fully raised position, and operate as a leveling mechanism with stop surfaces 320 on the left and right side of the system that contact the stabilizer 350, as depicted in the illustrated embodiment of FIG. 24

The system may be configured to maintain contact between the stop surface 320 and the stabilizer 350 in the fully raised position. By maintaining this contact, the position of the accessory 30 may be substantially maintained, thereby substantially preventing movement of the accessory 30 in the fully raised position. In the case of a rear snowplow, the stop surface 320 may engage the stabilizer 350 and operate as a vertical threshold beyond which the accessory 30 is not permitted to travel. This threshold and the contact between the stabilizer 350 and the stop surface 320 may also facilitate maintaining a position of the rear snow plow in the fully raised position. As a result, the threshold may prevent bending of the linkages 32 or actuators 34 due to contact with another object, such as being hit by another vehicle, or prevent aspects of the snow plow from hitting the vehicle in due to contact with another object. In one aspect, by maintaining position of the rear snow plow in the fully raised position, the stabilizer 350 and the stop surface 320 may allow the rear snow plow to be used in a push mode in which the vehicle operates in reverse to push snow with the rear snow plow on a snow pile. With the snow plow fixed in position and prevented from movement due to contact between the stabilizer 350 and the stop surface 320, snow can be more effectively push in this mode than would otherwise occur where the snow plow attempts to maintain its position with only actuators and linkages. The stabilizer 350 and stop surface 320 may enhance the ability of the snow plow to resist movement, left to right or up and down, and potentially avoiding damage to the snow plow in response to the shock caused by contact with another object and resulting contact with aspects of the vehicle or the hitch system.

In the illustrated embodiment, the accessory 30 is coupled to the accessory support 300 via one or more linkages 32 and one or more actuators 34 (e.g., hydraulic actuators). The linkages 32 and the actuators 34 may be configured to provide a degree of movement with respect to the accessory 30. This ability to move rather than being too rigid may avoid breakage of one or more components due to hitting an obstruction or other events that may result in movement of the accessory 30. In the case of a rear snowplow, the linkages 32 and the actuators 34 are configured to raise and lower the snowplow into contact with the ground or in close proximity thereto. As can be seen in FIG. 24, the linkages 32 and actuators 34 are configured such that the closer the snowplow is in proximity to the vehicle 10 the more the snowplow is displaced vertically down (e.g., relative to the vehicle trailer hitch 18).

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A vehicle accessory hitch for attaching an accessory to a vehicle, the vehicle having a frame and a bed mounted to the frame, the vehicle having a vehicle trailer hitch with a receiver for accepting a shank, said vehicle accessory hitch comprising:
    a first member opposing a second member, each of the first and second members including a bed section and a rear section, the bed section configured to extend from a forward area of the bed to a rearward area of the bed, the rear section configured to be in proximity to a rear of the vehicle, each said bed section of the first and second members configured to couple to the frame of the vehicle;
    a hitch support coupled to said rear section of said first member and said rear section of said second member, said hitch support having a shank member configured to interface with the receiver of the vehicle trailer hitch, wherein the vehicle accessory hitch is configured to couple to the frame of the vehicle via the first and second members and the vehicle trailer hitch of the vehicle; and
    an accessory support configured to removably couple to said first member, said second member and said hitch support, said accessory support configured to remain substantially stationary while coupled to said first member, said second member, and said hitch support, said accessory support configured to connect to and support a vehicle accessory near the rear of the vehicle.

2. The vehicle accessory hitch of claim 1 wherein said accessory support is directly coupled to said first member, said second member, and said hitch support.

3. The vehicle accessory hitch of claim 1 wherein said hitch support is fixedly and indirectly coupled to said first and second members.

4. The vehicle accessory hitch of claim 3 wherein said accessory support is mechanically connected to said hitch support, said first member, and said second member, wherein said accessory support includes a frame mechanically connected to said first member and said second member between said rear section of said first member and said rear section of said second member.

5. The vehicle accessory hitch of claim 1 wherein said accessory support provides a connection interface for coupling the accessory to the vehicle.

6. The vehicle accessory hitch of claim 1 wherein said bed section includes first and second connectors, each of said first and second connectors having a connection member and a coupler configured to respectively attach to first and second base members of the vehicle, wherein the first and second base members are coupled to the frame of the vehicle with the bed of the vehicle being between the first base member and the frame and between the second base member and the frame.

7. The vehicle accessory hitch of claim 6 wherein each of said couplers is configured to fit through an aperture respectively defined by the first and second base members, and each of said couplers is configured to accept a hitch pin in an installed position such that said hitch pin prevents said coupler from being pulled through the aperture.

8. The vehicle accessory hitch of claim 6 wherein each of said bed sections is directly connected to the first base member and the second base member, wherein said bed section of said first member is coupled to the frame via the first base member and the second base member, wherein said bed section of said second member is coupled to the frame via the first base member and the second base member.

9. The vehicle accessory hitch of claim 6 wherein the first and second base members connect to one or more vehicle mounting points common to a make of the vehicle.

10. The vehicle accessory hitch of claim 1 wherein each of said rear sections is removably fixed to each of said bed sections via a fastener, wherein a position of each of said rear sections relative to the rear of the vehicle is adjustable by removing said fastener to enable adjustment of a relative position between each of said rear sections and each of said bed sections and reinstalling said fastener.

11. The vehicle accessory hitch of claim 1 comprising an accessory support coupler coupled to said first member, said second member, and said hitch support, wherein said accessory support is coupled to said first member, said second member, and said hitch support indirectly via said accessory support coupler.

12. The vehicle accessory hitch of claim 11 wherein:
    said accessory support includes an upper support member, a lower support member, and a support receiver;
    said accessory support coupler includes an upper receptacle configured to hold the upper support member and a lower receptacle configured to hold the lower support member; and
    said accessory support coupler includes a locking receiver configured to accept a locking member in conjunction with the support receiver to lock the accessory support coupler to the accessory support.

13. The vehicle accessory hitch of claim 12 wherein the upper support member and the lower support member of the accessory support operate in conjunction with the upper receptacle and the lower receptacle to bear a majority of force due to contact between the ground and the accessory, and wherein the locking receiver, the locking member, and the support receiver are configured to bear a majority of force due to the accessory being raised off the ground.

14. The vehicle accessory hitch of claim 1 wherein the accessory support includes a stop surface configured to stop the accessory from moving vertically past a threshold.

15. A vehicle accessory hitch system for attaching an accessory to a vehicle, the vehicle having a frame and a bed mounted to the frame, the vehicle having a vehicle trailer hitch with a receiver for accepting a shank, the vehicle having one or more frame mounting points common to a make of the vehicle, said vehicle accessory hitch system comprising:
- a first base member configured to couple to at least one of the one or more frame mounting points through a surface of the bed, a second base member configured to couple to at least one of the one or more frame mounting points through the surface of the bed;
- a first hitch member opposing a second hitch member, each of the first and second hitch members including a bed section and a rear section, the bed section configured to extend from a forward area of the bed to a rearward area of the bed, the rear section configured to be in proximity to a rear of the vehicle, each of said bed sections of said first and second hitch members being coupled to said first and second base members;
- a hitch support coupled to a hitch support mount of the vehicle accessory hitch system, said hitch support having a shank member configured to interface with the receiver of the vehicle trailer hitch, wherein the vehicle accessory hitch system is configured to couple to the vehicle via said first and second hitch members and the vehicle trailer hitch; and
- an accessory support configured to removably couple to said first hitch member, said second hitch member and said hitch support, said accessory support configured to remain substantially stationary while coupled to said first hitch member, said second hitch member, and said hitch support, said accessory support configured to connect to and support a vehicle accessory near the rear of the vehicle.

16. The vehicle accessory hitch system of claim 15 wherein said accessory support is directly coupled to said first hitch member, said second hitch member, and said hitch support.

17. The vehicle accessory hitch system of claim 15 comprising an accessory support coupler coupled to said first hitch member, said second hitch member, and said hitch support, wherein said accessory support is coupled to said first hitch member, said second hitch member, and said hitch support indirectly via said accessory support coupler.

18. The vehicle accessory hitch system of claim 17 wherein:
- said accessory support includes an upper support member, a lower support member, and a support receiver;
- said accessory support coupler includes an upper receptacle configured to hold the upper support member and a lower receptacle configured to hold the lower support member; and
- said accessory support coupler includes a locking receiver configured to accept a locking member in conjunction with the support receiver to lock the accessory support coupler to the accessory support.

19. The vehicle accessory hitch system of claim 18 wherein the upper support member and the lower support member of the accessory support operate in conjunction with the upper receptacle and the lower receptacle to bear a majority of force due to contact between the ground and the accessory, and wherein the locking receiver, the locking member, and the support receiver are configured to bear a majority of force due to the accessory being raised off the ground.

20. The vehicle accessory hitch system of claim 15 wherein the accessory support includes a stop surface configured to stop the accessory from moving vertically past a threshold.

21. The vehicle accessory hitch system of claim 15 wherein each of said rear sections is adjustably fixed to each of said bed sections via a fastener, wherein a position of said each of said rear sections relative to the rear of the vehicle is adjustable by removing said fastener to enable adjustment of a relative position between said each of said rear sections and said each of said bed sections and reinstalling said fastener, whereby said each of said rear sections being removably fixed to each of said bed sections enables said vehicle accessory hitch system to be used in connection with a plurality of vehicle makes, each of the vehicle makes having a different distance between one or more mounting points and the rear of the vehicle.

22. The vehicle accessory hitch system of claim 15 wherein said accessory support is adjustably fixed to each of said first and second hitch members such that a distance between said accessory support and a vehicle ground is variable.

23. The vehicle accessory hitch system of claim 15 wherein the vehicle accessory is a rear mountable snow plow.

24. The vehicle accessory hitch system of claim 15 wherein said first and second base members include a plurality of apertures for accepting fasteners that respectively connect said bed sections and said first and second base members.

25. A method of attaching a vehicle accessory hitch to a vehicle, the vehicle having a frame and a bed mounted to the frame, the vehicle having a vehicle trailer hitch with a receiver for accepting a shank, the method comprising:
- coupling a first hitch member to the frame such that the first hitch member is substantially stationary relative to the frame; wherein the first hitch member includes a first bed section extending from a forward area of the bed to a rearward area of the bed and includes a first rear section disposed in proximity to a rear of the vehicle;
- coupling a second hitch member to the frame such that the second hitch member is substantially stationary relative to the frame, the second hitch member being in an opposing position relative to the first hitch member, wherein the second hitch member includes a second bed section extending from the forward area of the bed to the rearward area of the bed and includes a second rear section disposed in proximity to the rear of the vehicle;
- removably coupling an accessory support to the first and second hitch members such that the accessory support is substantially stationary relative to the first and second hitch members, the accessory support configured to enable mounting of a vehicle accessory to the vehicle accessory hitch; and
- inserting a shank member into the receiver of the vehicle trailer hitch to aid in mechanically stabilizing the first and second hitch members relative to the vehicle trailer hitch, the shank member being substantially stationary relative to the accessory support.

26. The method of claim 25 wherein said removably coupling the accessory support to the first and second hitch members includes directly coupling the accessory support to the first and second hitch members.

27. The method of claim 25 comprising providing an accessory support coupler to facilitate removably coupling the accessory support to the first and second hitch members, whereby the accessory support coupler enables indirectly coupling the accessory support to the first and second hitch members.

28. The method of claim 27 comprising:

receiving, in an upper receptacle of the accessory support coupler, an upper support member of the accessory support;

receiving, in a lower receptacle of the accessory support coupler, a lower support member of the accessory support; and receiving, in a locking receiver of the accessory support, a locking member to lock the accessory support to the accessory support coupler.

29. The method of claim 25 comprising:

adjusting a first position of the first rear section relative to the rear of the vehicle by changing a relative position between the first rear section and the first bed section;

adjusting a second position of the second rear section relative to the rear of the vehicle by changing a relative position between the second rear section and the second bed section; and whereby said adjusting the first position and the second position enables the vehicle accessory hitch to be used in connection with a plurality of vehicle makes, each of the vehicle makes having a different distance between one or more mounting points and the rear of the vehicle.

30. The method of claim 25 comprising decoupling the accessory support from the first and second hitch members.

* * * * *